(12) United States Patent
Siples et al.

(10) Patent No.: US 11,686,107 B2
(45) Date of Patent: Jun. 27, 2023

(54) CONFIGURABLE SCAFFOLDING SYSTEM

(71) Applicant: Pipp Mobile Storage Systems, Inc., Walker, MI (US)

(72) Inventors: Darin Siples, Highland, CA (US); Travis Schwartz, Highland Village, TX (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 17/471,955

(22) Filed: Sep. 10, 2021

(65) Prior Publication Data

US 2022/0098881 A1   Mar. 31, 2022

Related U.S. Application Data

(60) Provisional application No. 63/198,068, filed on Sep. 27, 2020.

(51) Int. Cl.
  *E04G 1/15* (2006.01)
  *E04G 5/14* (2006.01)

(52) U.S. Cl.
  CPC ............ *E04G 1/152* (2013.01); *E04G 5/142* (2013.01); *E04G 5/144* (2013.01); *E04G 2001/158* (2013.01)

(58) Field of Classification Search
  CPC ......... E04G 1/152; E04G 5/144; E04G 5/142; E04G 2001/158
  See application file for complete search history.

(56) References Cited

U.S. PATENT DOCUMENTS

| | | | | |
|---|---|---|---|---|
| 1,737,315 A | * | 11/1929 | MacDonald | E04G 1/151 |
| | | | | 182/222 |
| 2,198,960 A | * | 4/1940 | Deck | E04G 7/28 |
| | | | | 182/113 |
| 2,569,450 A | * | 10/1951 | Bouton | E04G 7/28 |
| | | | | 403/396 |
| 2,897,013 A | * | 7/1959 | Delp | E04G 7/301 |
| | | | | 52/645 |
| 2,928,443 A | * | 3/1960 | Sevachko | E04G 7/28 |
| | | | | 269/221 |
| 3,221,894 A | * | 12/1965 | Knuth | A47B 57/30 |
| | | | | 211/187 |
| 3,302,749 A | * | 2/1967 | Heaphy | B66C 23/32 |
| | | | | 182/178.6 |
| 3,302,751 A | * | 2/1967 | Ahlberg | E04G 5/02 |
| | | | | 182/223 |

(Continued)

FOREIGN PATENT DOCUMENTS

WO   2010026535   3/2010

OTHER PUBLICATIONS

PCT; International Search Report and Written Opinion dated Feb. 3, 2022 in Application No. PCT/US2021/049930.

*Primary Examiner* — Daniel P Cahn
*Assistant Examiner* — Shiref M Mekhaeil
(74) *Attorney, Agent, or Firm* — Gardner, Linn, Burkhart & Ondersma LLP

(57) ABSTRACT

A configurable scaffolding system is configured to facilitate simplified, reconfigurable access to a plurality of horticulture racks. With use of the configurable scaffolding system, operator convenience and safety are improved, and increased plant density in horticultural applications can be achieved.

4 Claims, 21 Drawing Sheets

(56) References Cited

U.S. PATENT DOCUMENTS

| | | | | |
|---|---|---|---|---|
| 3,684,058 A * | 8/1972 | Brown | | E04G 5/06 182/132 |
| 4,039,264 A * | 8/1977 | Sharp | | F16B 7/0486 403/49 |
| 4,187,929 A * | 2/1980 | Cyr | | E04G 1/15 248/235 |
| 4,262,774 A * | 4/1981 | Chez | | E04G 7/305 182/119 |
| 4,340,130 A * | 7/1982 | Payne | | E04G 1/154 182/119 |
| 4,427,191 A * | 1/1984 | Hess | | B27M 3/0053 269/221 |
| 4,708,252 A * | 11/1987 | Azzi | | A47B 57/04 52/646 |
| 4,711,183 A * | 12/1987 | Handler | | A47B 57/402 211/187 |
| 4,821,844 A * | 4/1989 | Huffman | | E04G 5/061 248/235 |
| 5,145,032 A * | 9/1992 | Puccinelli | | E04G 3/30 182/119 |
| 5,279,430 A * | 1/1994 | Benton | | B65G 1/023 211/151 |
| 5,433,326 A * | 7/1995 | Horian | | A47B 47/00 211/188 |
| 5,882,136 A * | 3/1999 | Pyritz | | E04G 1/152 403/301 |
| 6,000,495 A * | 12/1999 | Brinegar | | E04G 1/154 403/381 |
| 6,354,402 B1 * | 3/2002 | Masino | | E04G 1/154 182/178.1 |
| 6,691,993 B2 * | 2/2004 | Anton | | B25B 5/145 269/155 |
| 7,032,712 B2 * | 4/2006 | Schworer | | E04G 1/15 182/178.1 |
| 7,308,864 B1 | 12/2007 | Catner | | |
| 7,735,606 B1 * | 6/2010 | Norton | | E04G 5/06 182/186.7 |
| 7,975,803 B2 * | 7/2011 | Schwoerer | | E04G 7/22 182/178.1 |
| 8,132,649 B2 * | 3/2012 | Rogers | | E04G 7/301 403/49 |
| 8,905,292 B1 * | 12/2014 | Hayman | | E04G 7/02 228/178 |
| 9,308,869 B1 * | 4/2016 | Owens, Jr. | | E04G 1/28 |
| 10,280,635 B1 * | 5/2019 | Apostolopoulos | | F03D 80/50 |
| 10,883,282 B2 * | 1/2021 | Larson | | E04G 3/246 |
| 10,995,504 B1 * | 5/2021 | Cook | | E04G 7/22 |
| 2003/0226714 A1 * | 12/2003 | Masino | | E04G 1/154 182/178.1 |
| 2004/0007550 A1 * | 1/2004 | Leeman | | A47F 5/101 211/187 |
| 2004/0050621 A1 * | 3/2004 | Masino | | E04G 1/154 182/119 |
| 2005/0238442 A1 * | 10/2005 | Queen | | E04G 23/065 405/230 |
| 2005/0284083 A1 * | 12/2005 | Gridley | | E04B 1/4157 52/698 |
| 2006/0059856 A1 * | 3/2006 | Gilliland | | E04G 21/1808 52/749.1 |
| 2006/0180392 A1 * | 8/2006 | Scharff | | E04G 5/06 182/82 |
| 2007/0144832 A1 * | 6/2007 | Cresswell | | E04G 1/24 182/127 |
| 2007/0276526 A1 * | 11/2007 | Swanson | | B28B 23/0025 700/95 |
| 2009/0127027 A1 * | 5/2009 | Bird | | E04G 7/28 182/222 |
| 2010/0224447 A1 * | 9/2010 | Rogers | | E04G 5/08 182/222 |
| 2010/0322748 A1 * | 12/2010 | Lee | | B65G 1/02 414/277 |
| 2011/0278094 A1 * | 11/2011 | Gute | | E04G 1/14 182/223 |
| 2013/0068705 A1 * | 3/2013 | Parker | | A47B 53/00 211/183 |
| 2016/0281917 A1 * | 9/2016 | Murphy | | A47B 96/06 |
| 2019/0003191 A1 * | 1/2019 | Wylde | | E04G 1/15 |
| 2019/0169931 A1 * | 6/2019 | Bright | | E04G 1/30 |
| 2019/0307077 A1 | 10/2019 | Lert, Jr. et al. | | |
| 2019/0338540 A1 * | 11/2019 | Cerasi | | E04G 7/20 |
| 2022/0018142 A1 * | 1/2022 | Speelman | | E04G 5/045 |

* cited by examiner

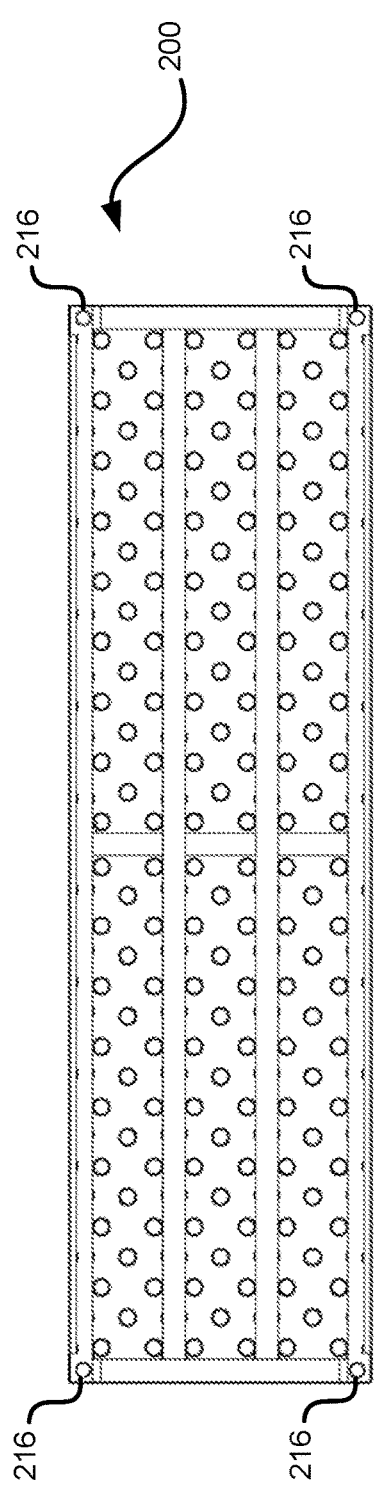
FIG. 4C
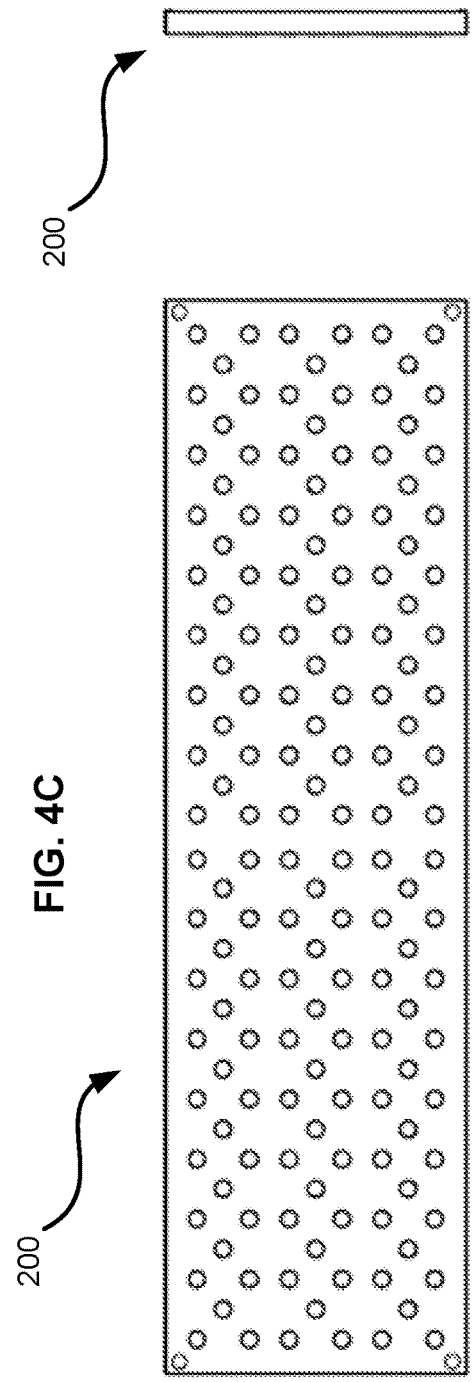
FIG. 4A
FIG. 4B
FIG. 4D

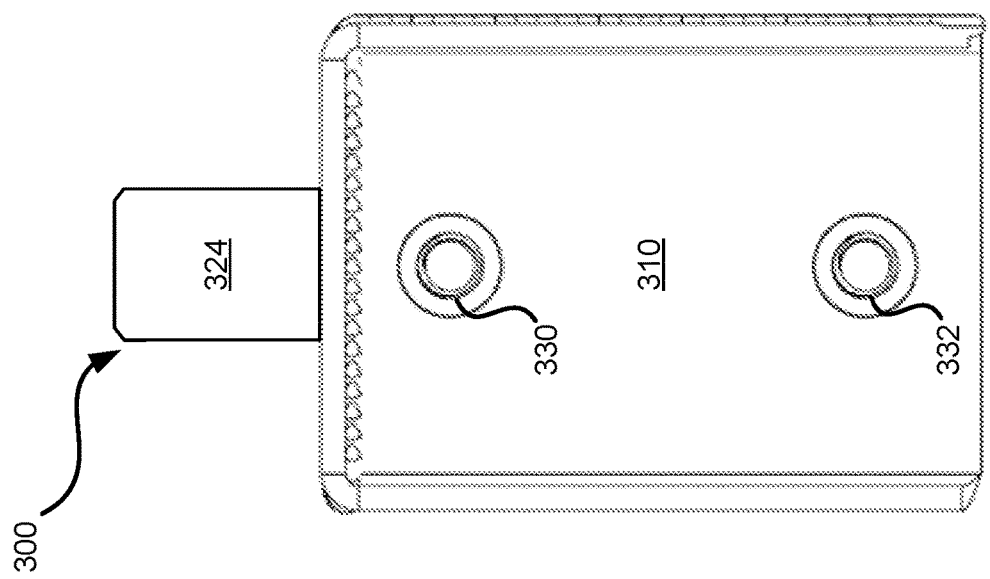
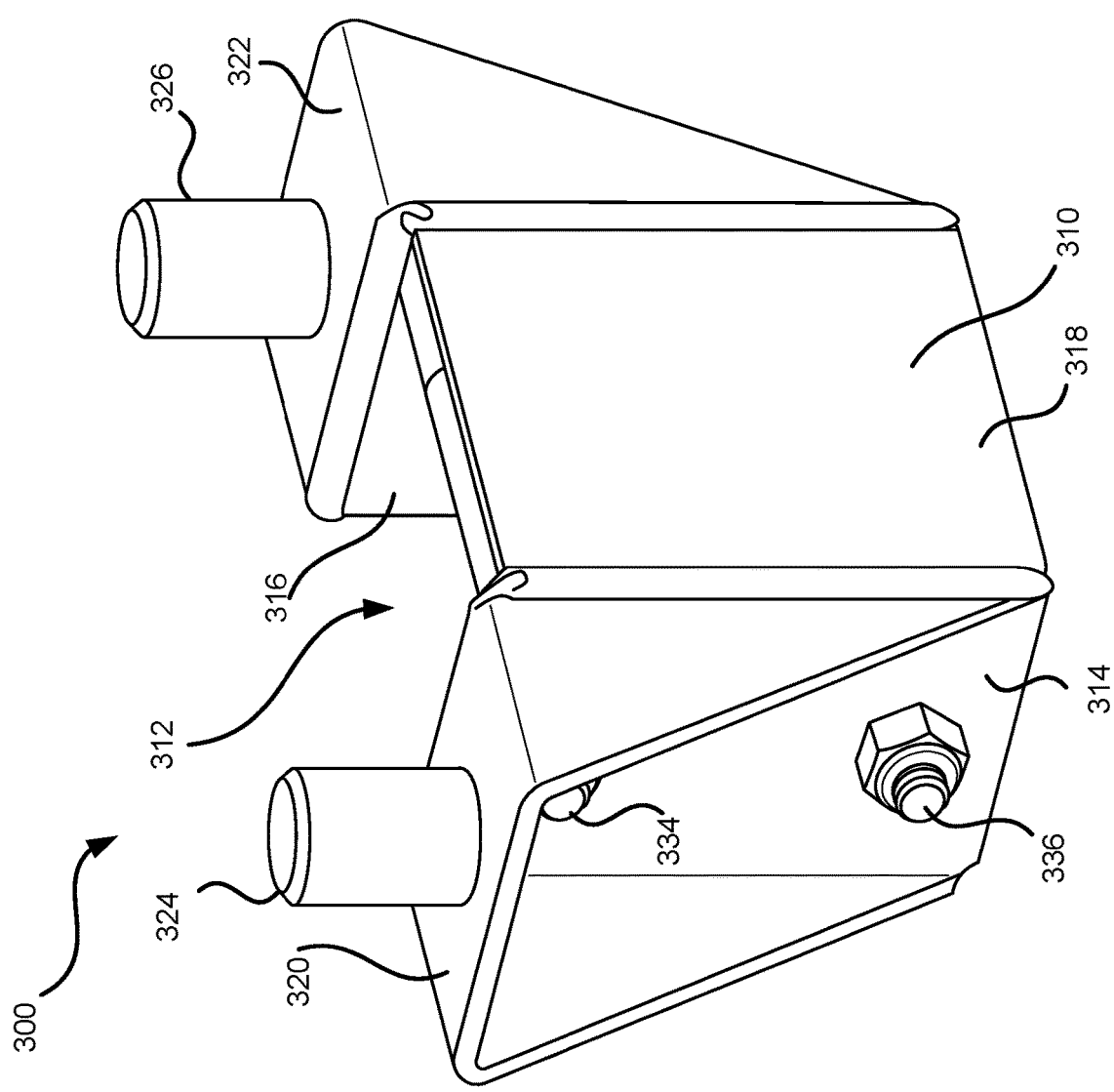

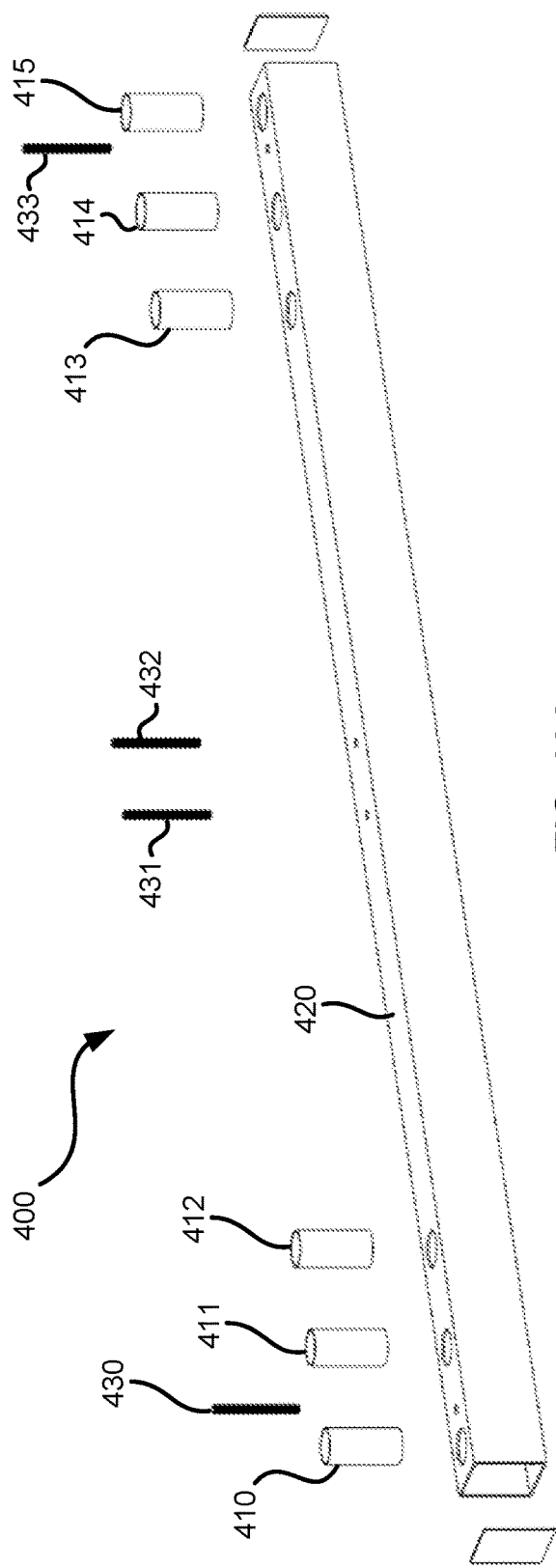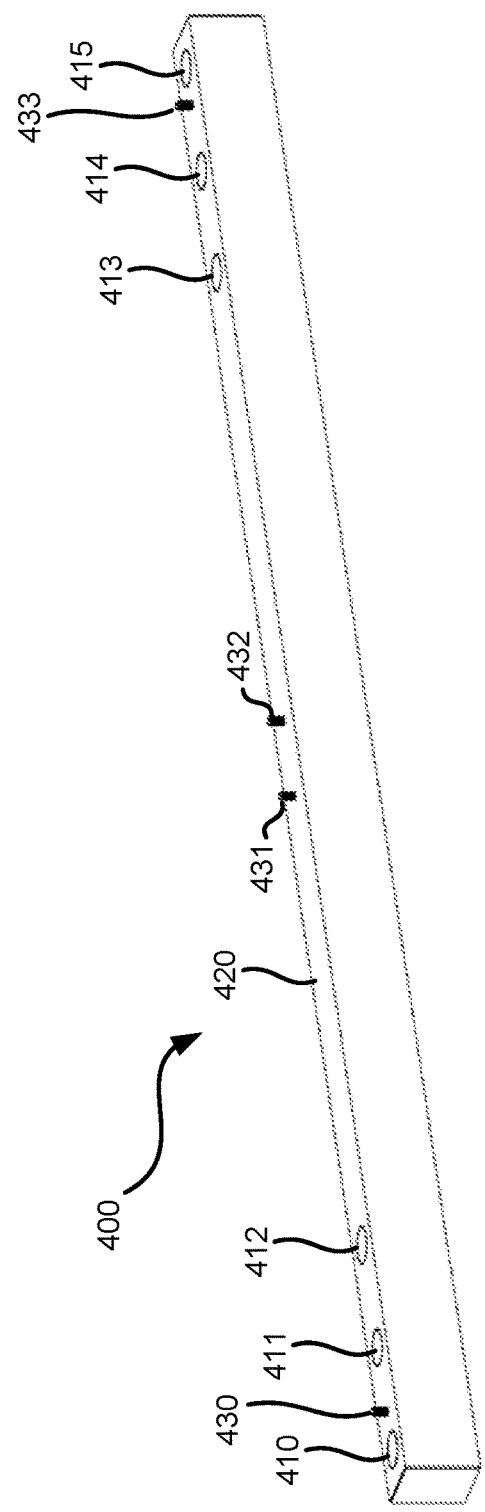
FIG. 10A
FIG. 10B

CONFIGURABLE SCAFFOLDING SYSTEM

CROSS REFERENCE TO RELATED APPLICATIONS

This application claims priority to, and the benefit of, U.S. Provisional Patent Application Ser. No. 63/198,068, entitled "CONFIGURABLE SCAFFOLDING SYSTEM," filed on Sep. 27, 2020. The contents of the foregoing application are hereby incorporated by reference (except for any subject matter disclaimers or disavowals, and except to the extent of any conflict with the disclosure of the present application, in which case the disclosure of the present application shall control).

TECHNICAL FIELD

The present disclosure relates to scaffolding, and in particular to configurable scaffolding systems utilized in connection with horticulture applications.

BACKGROUND

Horticulture racking systems, and other vertical storage, shelving, or racking systems, typically require a ladder, wheeled staircase, or scissor lift to access and/or service elevated racks or shelves. However, such components are often unwieldy, require undesirably wide aisles between racks, or have safety drawbacks. Accordingly, improved scaffolding and similar systems remain desirable.

SUMMARY

A configurable scaffolding system is disclosed, comprising a first work deck, a first vertical upright bracket configured to support the first work deck, and a trim cover, wherein an end of the first work deck is configured to be disposed between a portion of the first vertical upright bracket and a portion of the trim cover in an installed position.

In various embodiments, the first work deck comprises a square tubing frame at least partially covered with a sheet of material.

In various embodiments, the first work deck further comprises a sleeve defining an aperture, whereby the first vertical upright bracket is coupled to the first work deck.

In various embodiments, the configurable scaffolding system further comprises a second vertical upright bracket configured to support the first work deck.

In various embodiments, the first work deck is configured to be disposed between a first horticulture rack and a second horticulture rack, wherein the first vertical upright bracket is configured to be coupled to the first horticulture rack and the second vertical upright bracket is configured to be coupled to the second horticulture rack, and wherein a first end of the trim cover is configured to be coupled to the first horticulture rack and a second end of the trim cover is configured to be coupled to the second horticulture rack.

In various embodiments, the configurable scaffolding system further comprises a decking brace, wherein the decking brace is configured to be coupled between the first vertical upright bracket and the first work deck.

In various embodiments, the decking brace is configured to be coupled between the second vertical upright bracket and the first work deck.

In various embodiments, the configurable scaffolding system further comprises a second work deck, wherein the decking brace is configured to be coupled between the second vertical upright bracket and the second work deck.

In various embodiments, the configurable scaffolding system further comprises a safety flag.

In various embodiments, the first vertical upright bracket comprises a first wall, a second wall, and a third wall extending from the first wall to the second wall, wherein the first wall, the second wall, and the third wall define a channel configured to receive a vertical upright support, and the first wall is disposed opposite the channel from the second wall.

In various embodiments, the first vertical upright bracket further comprises a first tab extending from the first wall, a second tab extending from the second wall, a first attachment rod extending from the first tab, the first attachment rod is configured to be received by the first work deck, and a second attachment rod extending from the second tab, the second attachment rod is configured to be received by a second work deck.

A configurable scaffolding system is disclosed, comprising a first work deck, a second work deck, a first vertical upright bracket configured to support the first work deck and the second work deck, a second vertical upright bracket configured to support the first work deck and the second work deck, and a trim cover disposed between the first work deck and the second work deck. A first end of the first work deck is configured to be disposed between a first portion of the first vertical upright bracket and a first portion of the trim cover in an installed position.

In various embodiments, a second end of the second work deck is configured to be disposed between a second portion of the first vertical upright bracket and a second portion of the trim cover in the installed position.

In various embodiments, the trim cover comprises a first end, a second end, and a tube extending between the first end and the second end.

In various embodiments, the first end of the trim cover comprises a first vertical tab and a second vertical tab whereby the trim cover is configured to be coupled to a vertical upright support of a shelving apparatus, a first horizontal tab extending from the first vertical tab, wherein the first portion of the trim cover comprises the first horizontal tab, and a second horizontal tab extending from the second vertical tab, wherein the second portion of the trim cover comprises the second horizontal tab.

In various embodiments, the first vertical upright bracket comprises a first wall, a second wall, a third wall extending from the first wall to the second wall, wherein the first wall, the second wall, and the third wall define a channel configured to receive the vertical upright support, and the first wall is disposed opposite the channel from the second wall, a first tab extending from the first wall, a second tab extending from the second wall, a first attachment rod extending from the first tab, the first attachment rod is configured to be received by the first work deck, and a second attachment rod extending from the second tab, the second attachment rod is configured to be received by the second work deck.

In various embodiments, the tube is substantially flush with the first work deck and the second work deck.

A method for servicing a horticulture rack is disclosed, the method comprising utilizing a first horticulture rack and a second horticulture rack to grow plants, wherein the first horticulture rack and the second horticulture rack are separated by an aisle, coupling, to the first horticulture rack and to the second horticulture rack, a configurable scaffolding system, wherein the configurable scaffolding system is disposed at least partially in the aisle, and accessing, via the configurable scaffolding system and by a system user, the plants in the first horticulture rack and the second horticulture rack.

In various embodiments, the method further comprises decoupling, from the first horticulture rack and the second horticulture rack, the configurable scaffolding system, and coupling, to the second horticulture rack and to a third horticulture rack, the configurable scaffolding system.

In various embodiments, the configurable scaffolding system comprises a work deck, at least one vertical upright bracket, at least one decking brace, a safety flag, and a trim cover.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 4A, 4B, 4C, and 4D illustrate a top view, a side view, a bottom view, and a front view, respectively, of the work deck of FIG. 2 in accordance with various exemplary embodiments.

FIG. 5A illustrates a perspective view of a vertical upright bracket of the scaffolding system of FIG. 1A and FIG. 1B in accordance with various exemplary embodiments.

FIG. 5B illustrates a side view of the vertical upright bracket of FIG. 5A with the fasteners omitted, in accordance with various exemplary embodiments.

FIGS. 10A and 10B illustrate an assembly view and assembled view of the decking brace of FIG. 9 with the attachment rods omitted in accordance with various exemplary embodiments.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for racking, storage, and/or shelving systems, modular horticulture, lighting, irrigation, ventilation, drainage systems, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical customizable scaffolding system and/or related methods of use.

Principles of the present disclosure may be compatible with and/or may be utilized in connection with principles disclosed in U.S. patent application Ser. No. 16/802,036 filed on Feb. 26, 2020, now U.S. Patent Application Publication No. 2020/0268152 entitled "CUSTOMIZABLE SLIDABLE SHELVING AND SUPPORT SYSTEM FOR HORTICULTURE APPLICATIONS." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

Figure 1A:
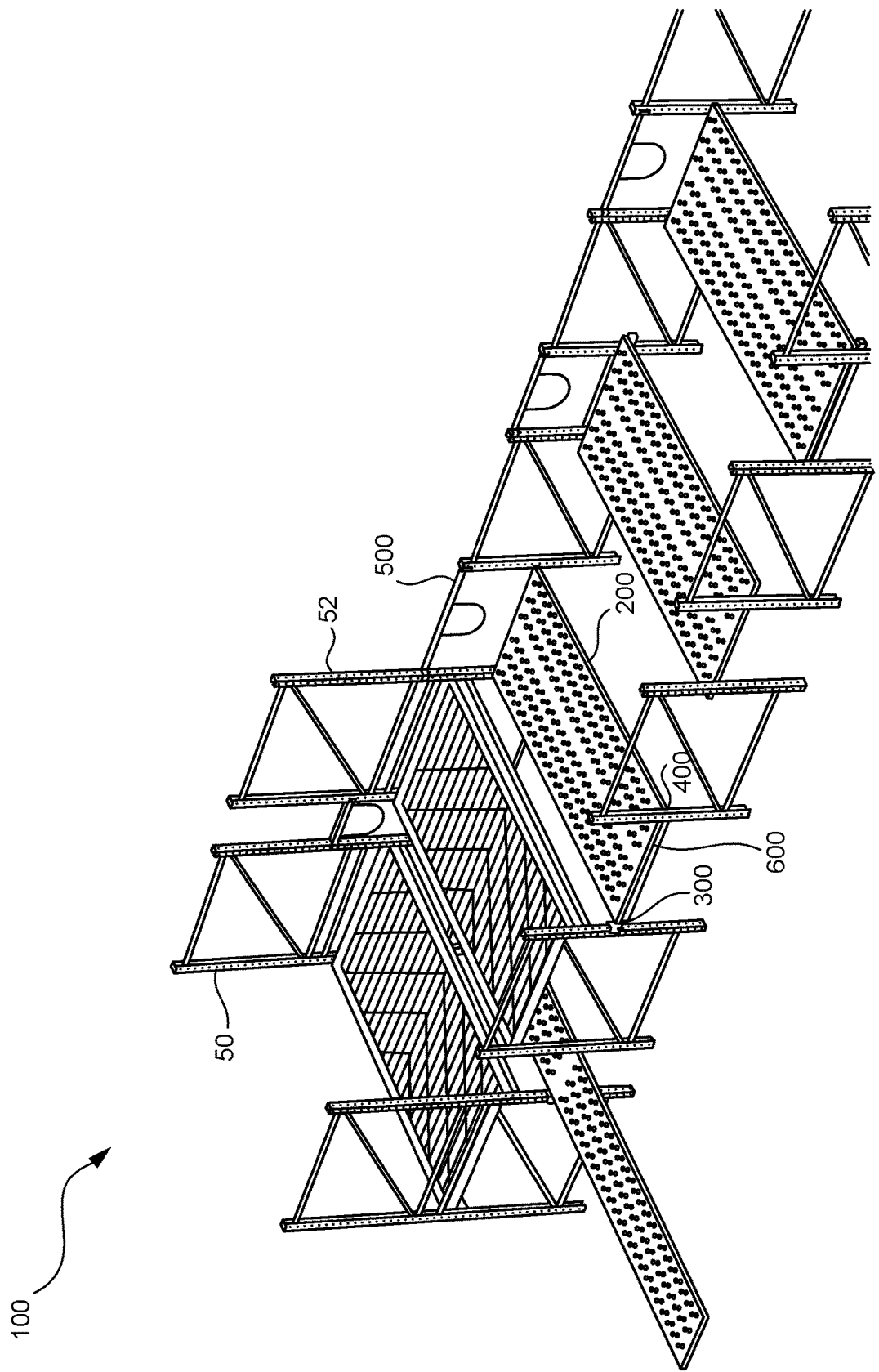
FIGS. 1A and 1B illustrate a scaffolding system including scaffolding system components coupled to horticulture racks in accordance with various exemplary embodiments.
Figure 1B:
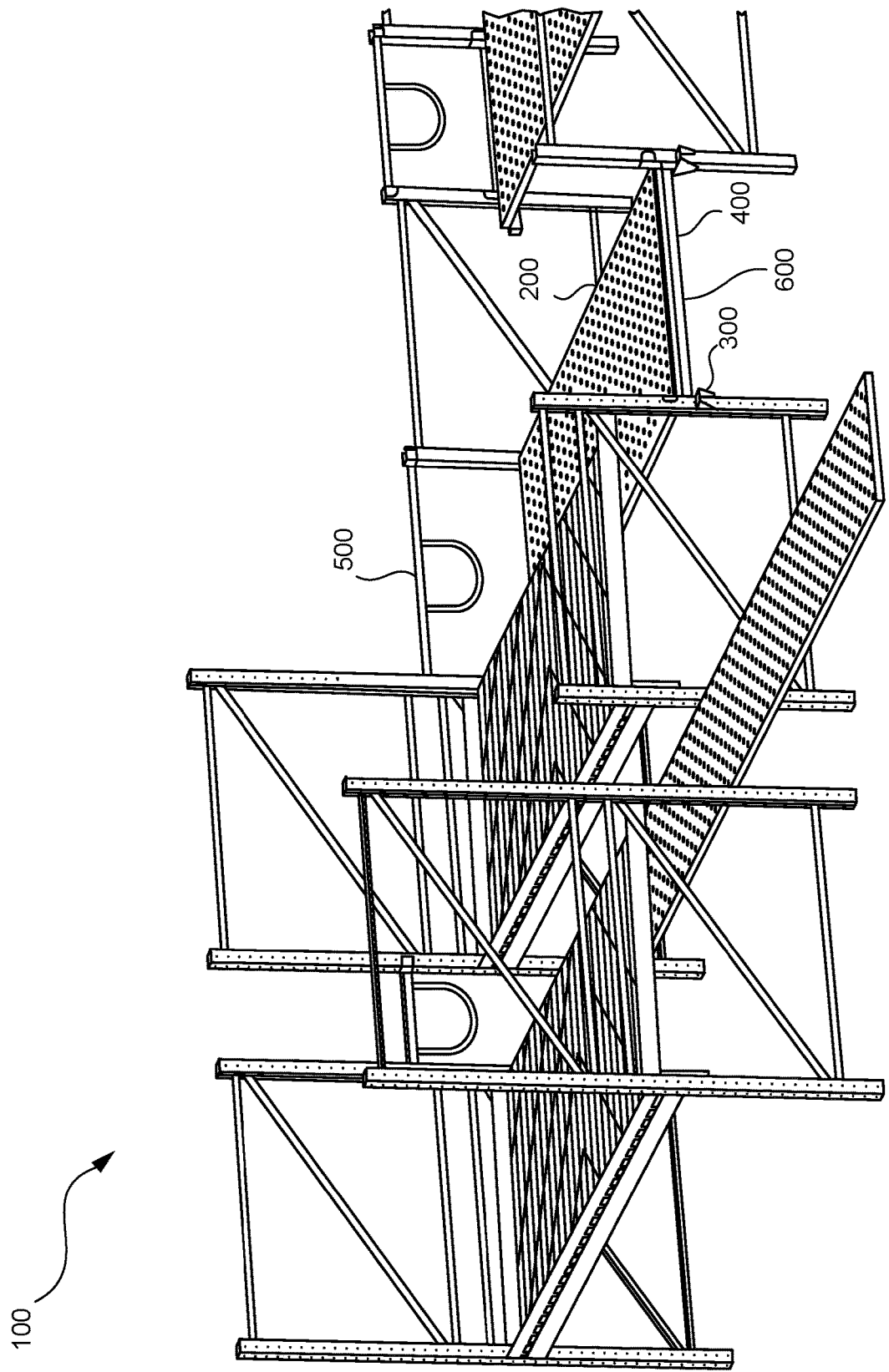
Figure 2:
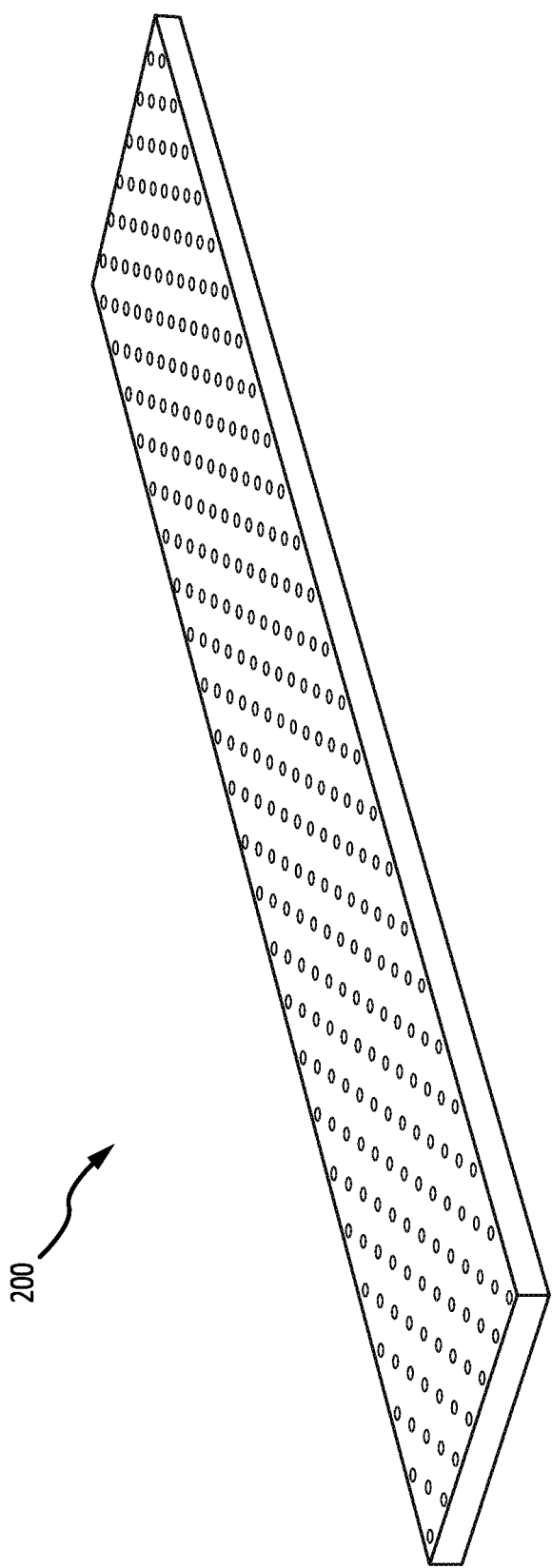
FIG. 2 illustrates a perspective view of a work deck of the scaffolding system of FIG. 1A and FIG. 1B in accordance with various exemplary embodiments.
Figure 3:
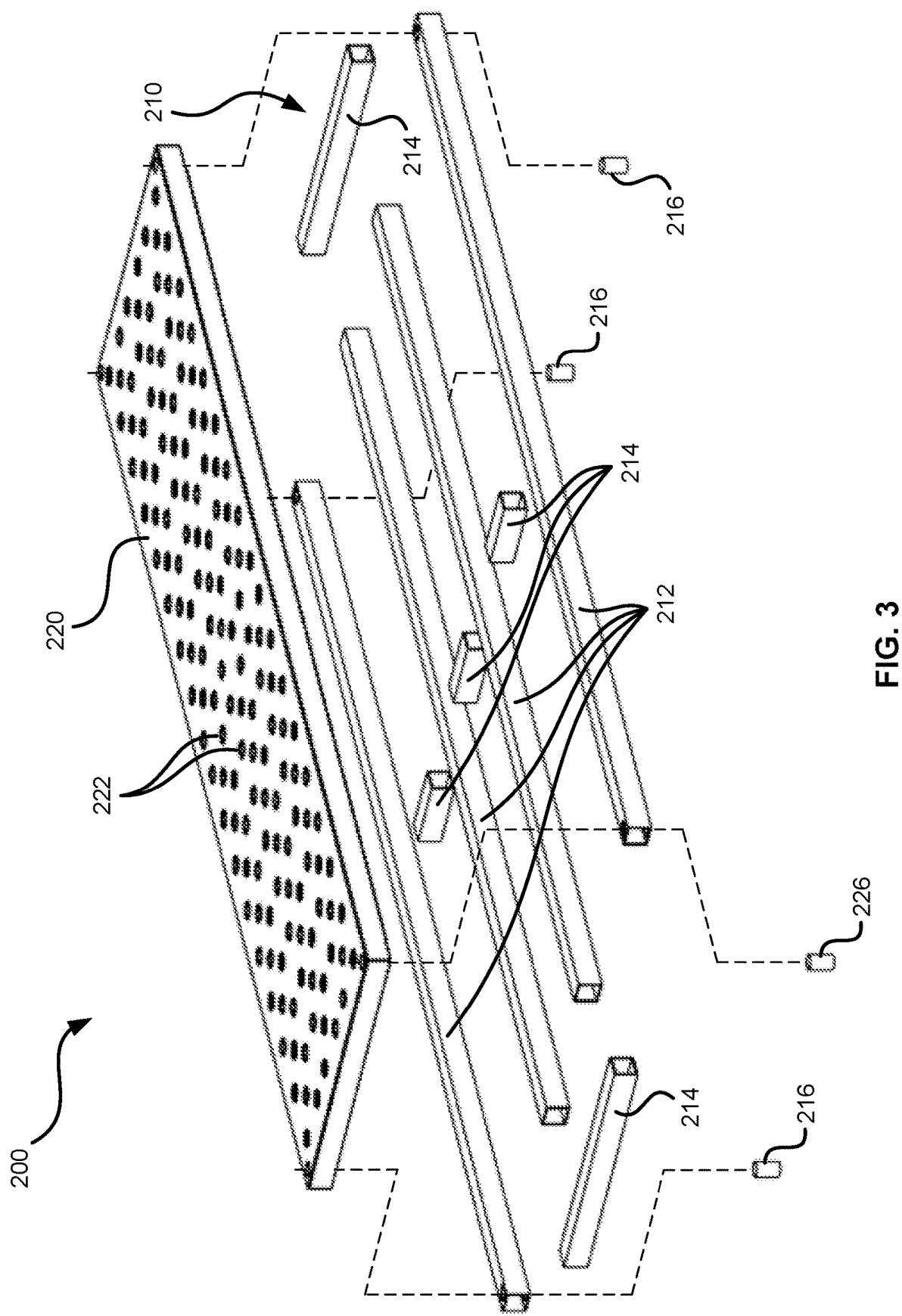
FIG. 3 illustrates an assembly view of the work deck of FIG. 2 in accordance with various exemplary embodiments.

With reference now to FIG. 1A and FIG. 1B, in various exemplary embodiments, a customizable scaffolding system 100 (also referred to herein as a configurable scaffolding system) comprises components that interface with and/or attach to or decouple from an existing vertical horticulture racking system (e.g., first horticulture rack 50 and/or second horticulture rack 52). Scaffolding system 100 allows workers to safely access the various tiers of racking and service plants. Use of scaffolding system 100 eliminates the need to utilize a ladder, wheeled staircase, or scissor lift. Additionally, use of scaffolding system 100 allows access rows or aisles between vertical racks (e.g., between first horticulture rack 50 and second horticulture rack 52) to be made narrower, leaving more space for racks and thus significantly improving the density of plants that are able to be grown in a particular space.

Scaffolding system 100 may be formed from any suitable materials, for example aluminum, steel, high-strength plastics, and/or the like. Components may be machined, stamped, cast, and/or otherwise formed in any suitable manner or process. Additionally, components may be permanently and/or releasable coupled to one another and/or to other systems or devices via any suitable method, for example welding, brazing, and/or mechanical fasteners such as rivets, screws, bolts, and/or the like.

In various exemplary embodiments, scaffolding system 100 comprises one or more each of a work deck 200, a vertical upright bracket 300, a decking brace 400, a safety flag 500 (fixed and/or telescoping) and a trim cover 600 (fixed and/or telescoping). However, additional and/or fewer components may be utilized in certain embodiments, as suitable. In this manner, scaffolding system components (e.g., work deck 200, vertical upright bracket 300, decking brace 400, safety flag 500, and/or a trim cover 600) of the present disclosure may be coupled between adjacent vertical horticulture racking systems (e.g., first horticulture rack 50 and second horticulture rack 52).

An operator may install/place a scaffolding system 100 in a particular location in order to access plants in one or more horticulture racks. Thereafter, the scaffolding system 100 and/or components thereof may be removed from a first location and placed in a second location in order to access plants in other horticulture racks. In this manner, operator access is simplified, safety is increased, and plant growing density and yield may be increased.

Work Deck:

With reference to FIG. 2 through FIG. 4D, a scaffolding work deck 200 is illustrated, in accordance with various embodiments. Work deck 200 may be made of a square tubing frame 210 and covered with a sheet 220 of material. Sheet 220 may be "pooch" punched for traction. Stated differently, sheet 220 may comprise a plurality of raised edges 222 defining apertures in sheet 220. Frame 210 may include a plurality of longitudinally extending tubes 212 and a plurality of transversely extending tubes 214. Longitudinally extending tubes 212 and transversely extending tubes 214 may be connected together with a metal joining process, such as a weld, a solder, and/or a braze.

Work deck 200 may further include a sleeve 216 (also referred to as a gusset) at each corner thereof. Each sleeve 216 may extend through a hole in the tube (e.g., longitudinally extending tube 212) at the corner of the work deck 200. A centerline axis of each sleeve 216 may extend substantially orthogonal to the surface of the work deck 200. In various embodiments, each sleeve 216 is substantially flush with sheet 220. In various embodiments, each sleeve 216 is recessed within sheet 220. Each sleeve 216 may be connected to an associated tube (e.g., tube 212 or tube 214) with a metal joining process, such as a weld, a solder, and/or a braze. The work deck 200 attaches in-between two shelving apparatus (for example, as disclosed in U.S. Patent Application Publication No. 2020/0268152). The work deck 200 may slide into vertical upright brackets before being secured by a locking trim cover, as described herein. Each corner of the work deck 200 includes a sleeve 216 that accepts an attachment rod on the vertical upright bracket 300. In this manner, sleeve 216 provides a reinforced aperture configured to receive an attachment rod for securing the work deck 200 to an associated vertical upright bracket 300.

Sheet 220 may be made from metal, such as aluminum for example, a high-strength plastic material, a fiber-reinforced composite material, or any other suitable material. The work deck 200 may be configured to be lightweight enough for a single person to carry and assemble, as scaffolding system 100 may typically be utilized as temporary and not a permanent scaffolding. The work deck 200 may be e-coated and/or powder coated. The work deck 200 may be sized and/or configured as needed, for example depending on the size and configuration of an associated horticulture racking system. In one exemplary embodiment, work deck 200 is 20 inches wide and 96 inches long, though work deck 200 may comprise any suitable width and length as desired.

Figure 6:
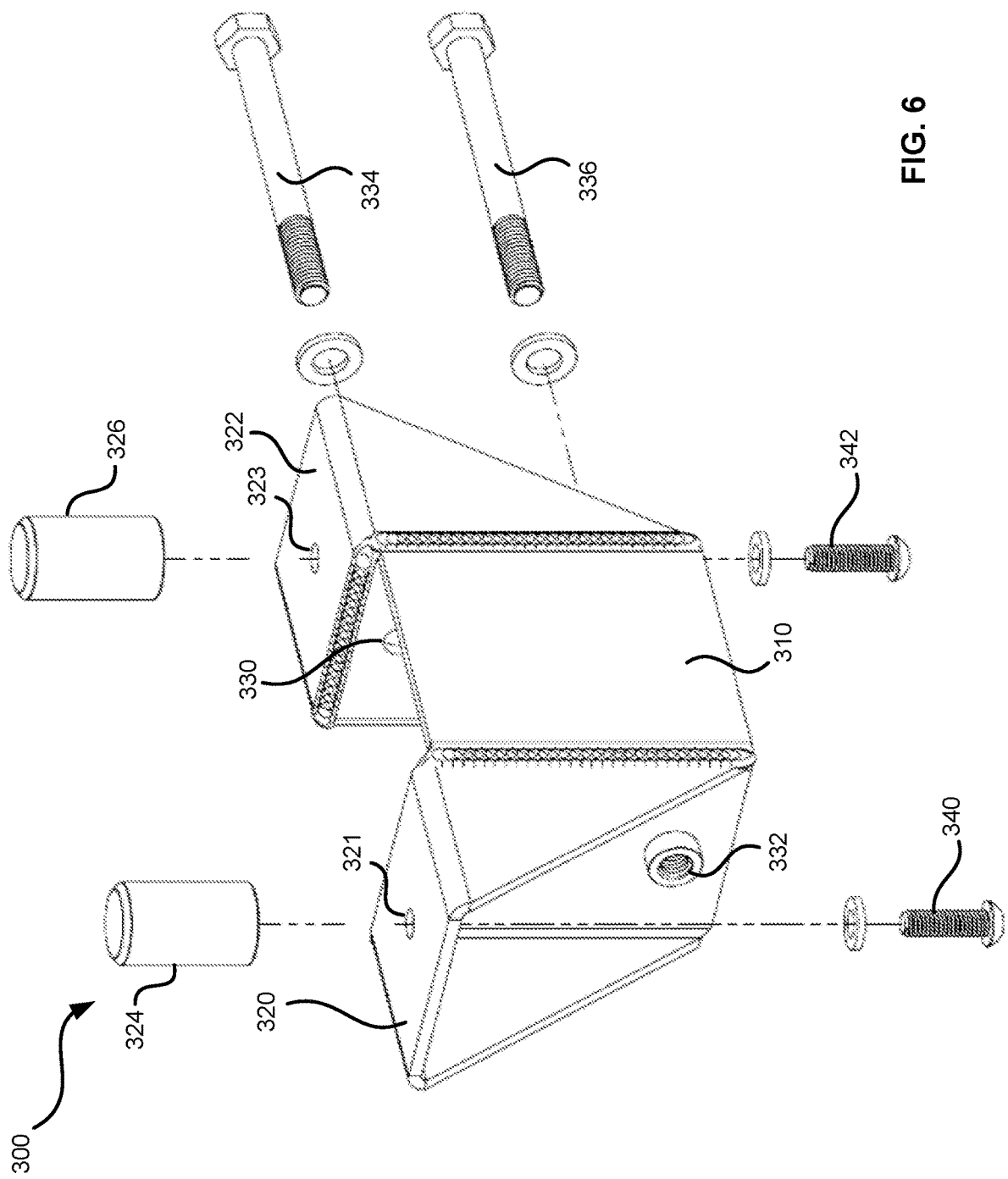
FIG. 6 illustrates an assembly view of the vertical upright bracket of FIG. 5A in accordance with various exemplary embodiments.

Vertical Upright Brackets:

With reference to FIG. 5A through FIG. 6, a vertical upright bracket 300 is illustrated, in accordance with various embodiments. Vertical upright bracket 300 may include a body 310 that is generally U-shaped to define a channel 312 configured to receive a vertical upright support of a shelving apparatus. In this manner, vertical upright bracket 300 may be permanently or releasably attached to the vertical upright support at intervals that correspond to the tiers on the racks as determined by the operator. Body 310 may include a first wall 314 and a second wall 316. First wall 314 and second wall 316 may be disposed on opposite sides of channel 312. First wall 314 and second wall 316 may be oriented parallel to each other. First wall 314 and second wall 316 may be connected by a third wall 318. Third wall 318 may be oriented orthogonal to first wall 314 and second wall 316. In this regard, channel 312 may be defined by first wall 314, second wall 316, and third wall 318. In one exemplary embodiment, the vertical upright bracket 300 is made of e-coated and/or powder-coated steel.

Vertical upright bracket 300 may include a first tab 320 extending from the body 310. First tab 320 may extend from first wall 314. First tab 320 may be oriented orthogonal with respect to first wall 314. An attachment rod 324 (also referred to herein as a first attachment rod) may be mounted to first tab 320. Attachment rod 324 may be configured to be received into a sleeve of a first work deck (e.g., sleeve 216 of work deck 200) to support the first work deck in an installed position with respect to a shelving apparatus.

First wall 314 and second wall 316 may include a first set of corresponding apertures 330 for receiving a first fastener 334 to extend between the first wall 314 and the second wall 316. First wall 314 and second wall 316 may include a second set of corresponding apertures 332 for receiving a second fastener 336 to extend between the first wall 314 and the second wall 316. In this manner, body 310 may be secured to the vertical upright support of the shelving apparatus.

Vertical upright bracket 300 may further include a second tab 322 extending from the body 310. Second tab 322 may extend from second wall 316. Second tab 322 may be oriented orthogonal with respect to second wall 316. An attachment rod 326 (also referred to herein as a second attachment rod) may be mounted to second tab 322. Attachment rod 326 may be configured to be received into a sleeve of a second work deck (e.g., sleeve 216 of work deck 200) to support the second work deck in an installed position with respect to a shelving apparatus.

With reference to FIG. 6, an assembly view of vertical upright bracket 300 is illustrated, in accordance with various embodiments. Attachment rod 324 may be coupled to first tab 320 via a first fastener 340. First tab 320 may comprise an aperture 321 for receiving first fastener 340. Attachment rod 326 may be coupled to second tab 322 via a second fastener 342. Second tab 322 may comprise an aperture 323 for receiving second fastener 342.

Figure 7B:
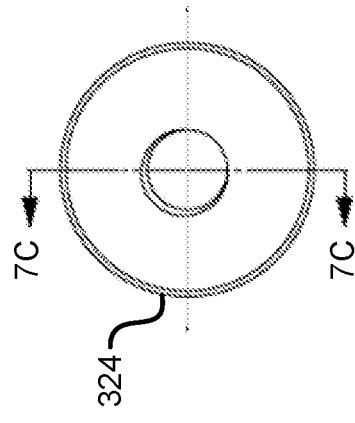
FIGS. 7A, 7B, and 7C illustrate a perspective view, a top view, and a cross-section view, respectively, of an attachment rod for the vertical upright bracket of FIG. 5A in accordance with various exemplary embodiments.
Figure 7C:
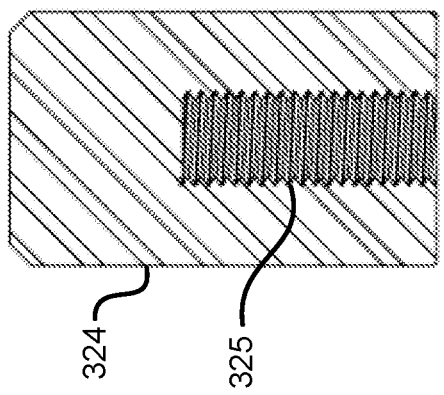
Figure 7A:
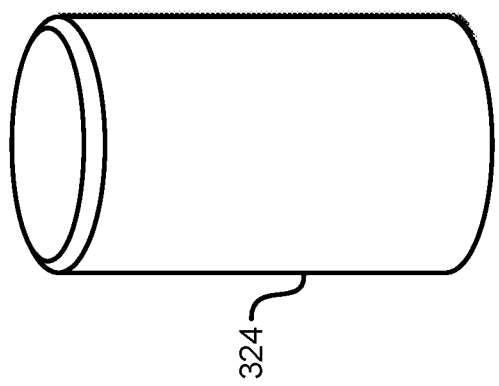

With reference to FIG. 7A, FIG. 7B, and FIG. 7C, attachment rod 324 is illustrated, in accordance with various embodiments. Attachment rod 324 may comprise a threaded aperture 325 for receiving fastener 340 (see FIG. 6). In this regard, attachment rod 324 may be removably coupled to first tab 320 (see FIG. 6). However, it is contemplated herein that attachment rod 324 may be welded to first tab 320, in accordance with various embodiments.

Figure 8:
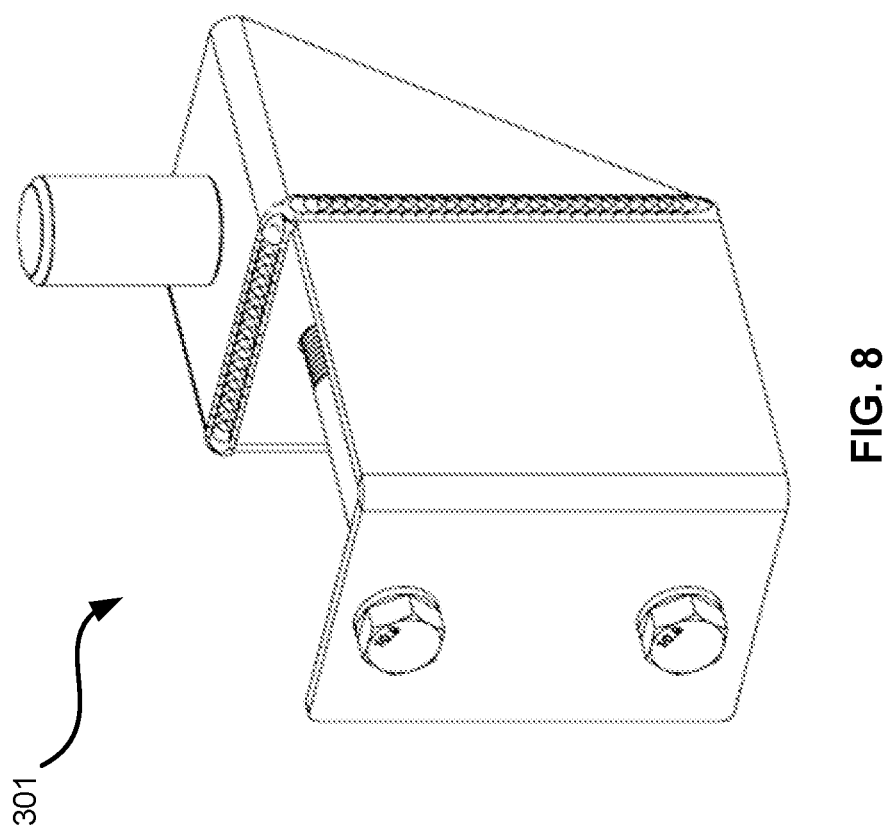
FIG. 8 illustrates a perspective view of an end vertical upright bracket of the scaffolding system of FIG. 1A and FIG. 1B in accordance with various exemplary embodiments.

With reference to FIG. 8, an end vertical upright bracket 301 is illustrated, in accordance with various embodiments. End vertical upright bracket 301 is similar to vertical upright bracket 300, except that end vertical upright bracket 301 only includes one tab and associated attachment rod. In this manner, end vertical upright bracket 301 may be configured to be coupled to the last (i.e., the end) vertical upright support of a row of shelving apparatus. In this manner, end vertical upright bracket 301 may support a work deck at only one side of the bracket.

Figure 9:
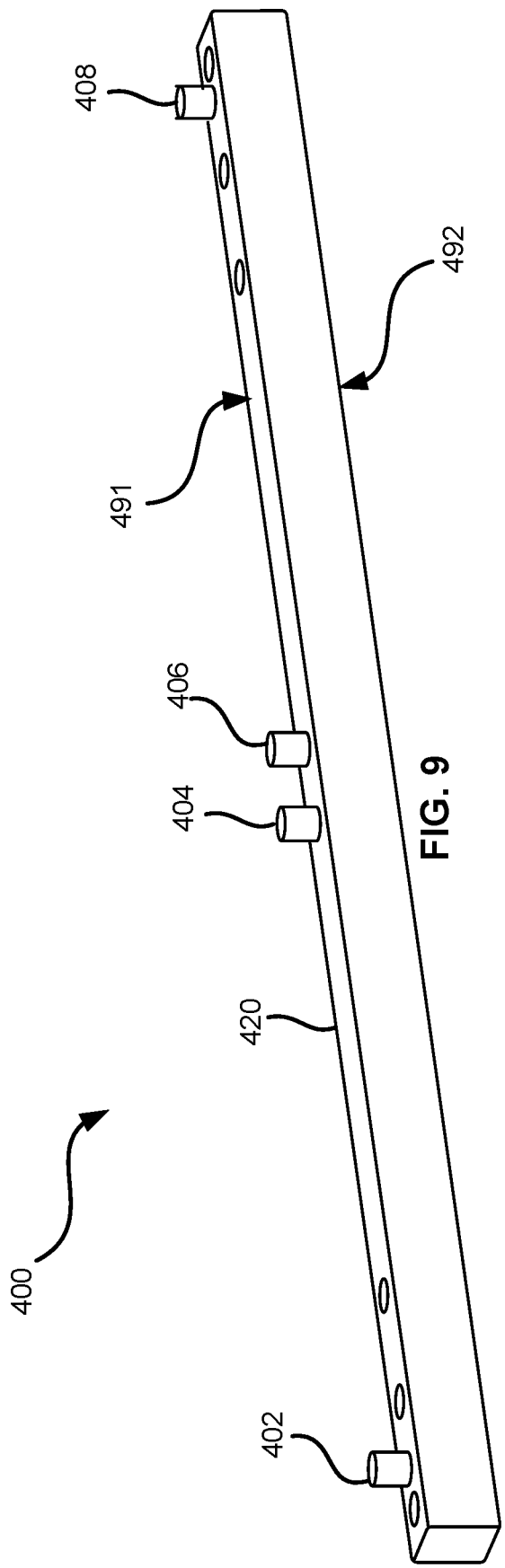
FIG. 9 illustrates a perspective view of a decking brace of the scaffolding system of FIG. 1A and FIG. 1B in accordance with various exemplary embodiments.

Decking Brace:

With reference to FIG. 9, a decking brace 400 is illustrated, in accordance with various embodiments. Decking brace 400 includes a square tube 420. In various embodiments, the square tube 420 is e-coated and/or powder coated. Square tube 420 may be made of a metal material, such as steel for example. In one exemplary embodiment, the decking brace 400 is made of e-coated and/or powder-coated square steel tubing with a plurality of attachment rods on the top face 491 (for example, the same or similar rods as on the vertical upright brackets 300 (see FIG. 6)). In various embodiments, decking brace 400 includes four attachment rods (e.g., attachment rod 402, attachment rod 404, attachment rod 406, and attachment rod 408. The attachment rods 402, 404, 406, 408 may be made of a metal material, such as stainless steel for example.

Figure 11:
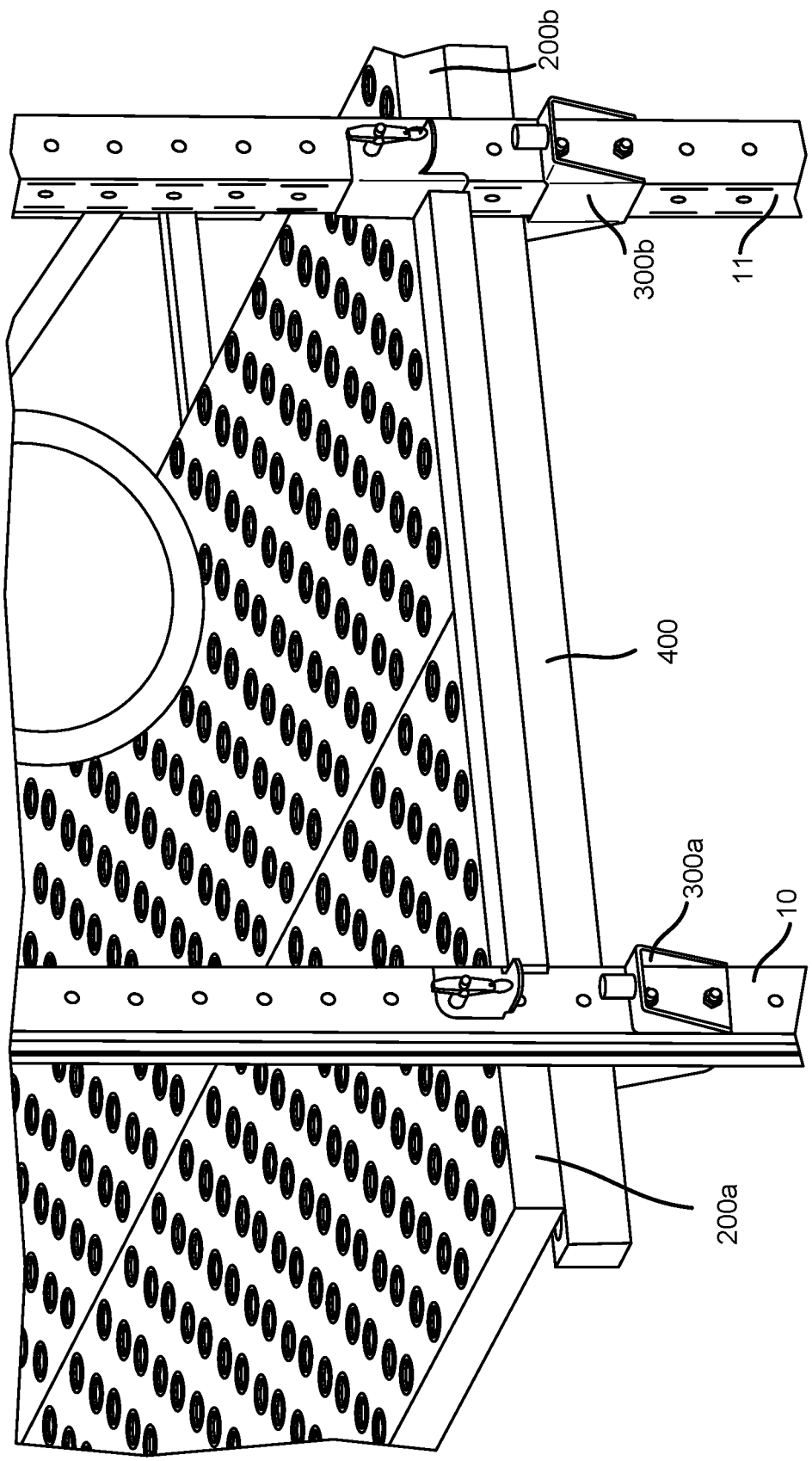
FIG. 11 illustrates a perspective view of a scaffolding system installed onto a vertical horticulture racking system with a side-by-side work deck arrangement with the vertical upright brackets installed at inner sleeves of a decking brace in accordance with various exemplary embodiments.

With reference to FIG. 10A and FIG. 10B, an assembly view and an assembled view, respectively, of the decking brace 400 are illustrated with the attachment rods omitted for clarity purposes. Decking brace 400 may further include a plurality of sleeves (e.g., sleeve 410, sleeve 411, sleeve 412, sleeve 413, sleeve 414, and/or sleeve 415) (also referred to as gussets)). The sleeves 410, 411, 412, 413, 414, 415 may be sized to accept the attachment rods (e.g., attachment rod 324 and/or attachment rod 326) of vertical upright bracket 300 (see FIG. 5A) from the bottom face 492 of square tube 420. In various embodiments, a first plurality of sleeves (i.e., sleeve 410, sleeve 411, and sleeve 412) are disposed at a first end of decking brace 400 and a second plurality of sleeves (i.e., sleeve 413, sleeve 414, and sleeve 415) are disposed at a second, opposite end of decking brace 400. Including multiple sleeves on the ends of the decking brace 400 allows the operator to vary the actual width of the decking by predetermined increments (e.g., two inch increments or any other desired increment dimensions). For example, with reference to FIG. 11, decking brace 400 is installed onto vertical upright support 10 and vertical upright support 11 with the ends of decking brace 400 extending past vertical upright support 10 and vertical upright support 11. In this regard, the distance between vertical upright support 10 and vertical upright support 11 may be decreased by inserting the attachment rod of first vertical upright bracket 300a into sleeve 412 (see FIG. 10B) of decking brace 400 and inserting the attachment rod of second vertical upright bracket 300b into sleeve 413 (see FIG. 10B). In contrast, the distance between vertical upright support 10 and vertical upright support 11 may be increased by inserting the attachment rod of first vertical upright bracket 300a into sleeve 410 (see FIG. 10B) of decking brace 400 and inserting the attachment rod of second vertical upright bracket 300b into sleeve 415 (see FIG. 10B).

With reference to FIG. 10A and FIG. 10B, a plurality of fasteners (i.e., fastener 430, fastener 431, fastener 432, and fastener 433) may be coupled to square tube 420. The attachment rods 402, 404, 406, 408 may be coupled to square tube 420 via the plurality of fasteners 430, 431, 432, 433—e.g., similar to attachment rod 324 of FIG. 6 through FIG. 7C.

Figure 12:
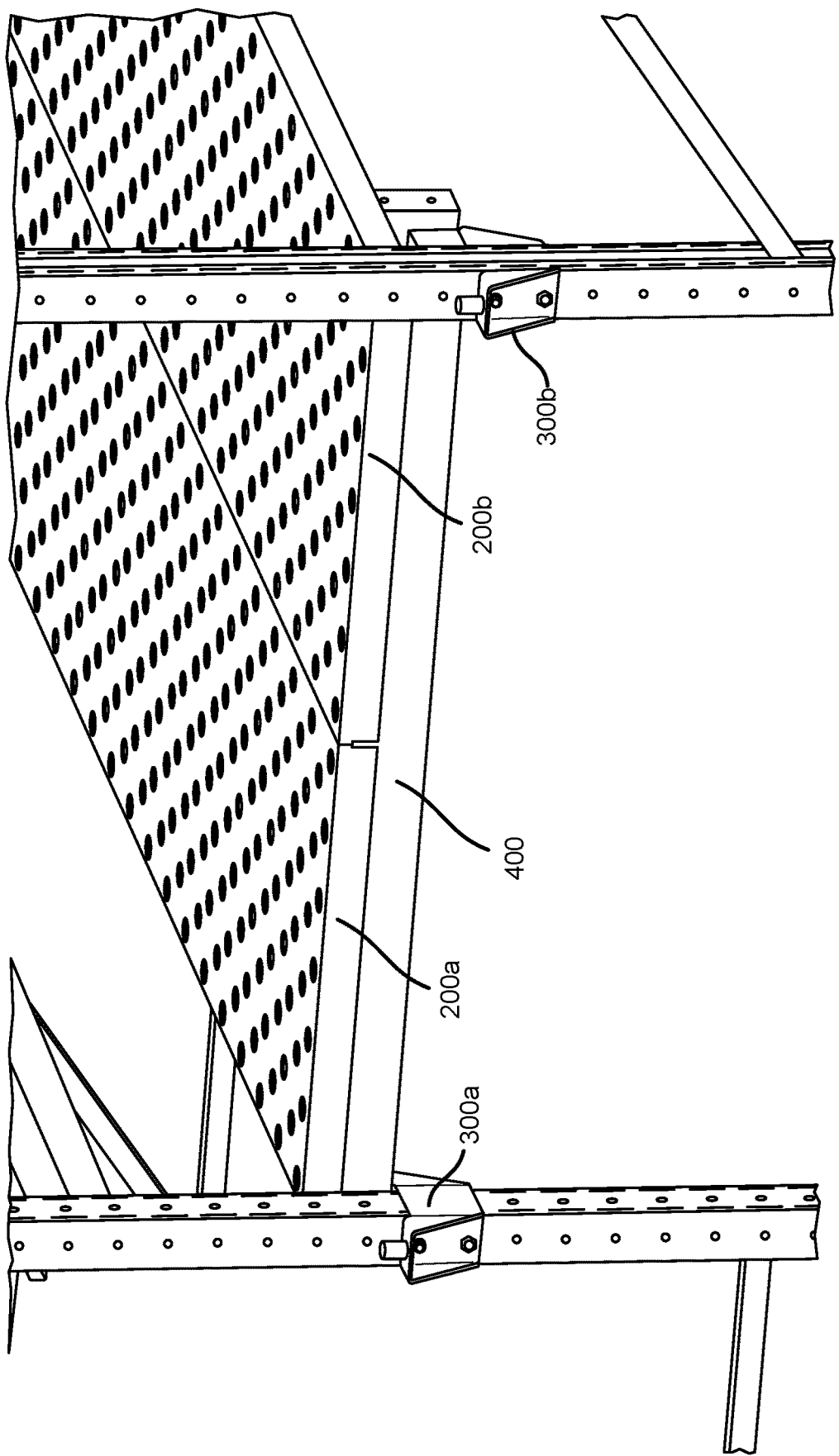
FIG. 12 illustrates a perspective view of the scaffolding system of FIG. 11 with the vertical upright brackets installed at outermost sleeves of the decking brace in accordance with various exemplary embodiments.

With reference to FIG. 12, decking brace 400 gives operators the ability to make a wider scaffolding deck as desired by connecting two work decks (i.e., work deck 200a and work deck 200b) side-by-side by setting the attachment rods (e.g., see attachment rod 324 and attachment rod 326 of FIG. 5A) of first vertical upright bracket 300a and second vertical upright bracket 300b into the sleeves (e.g., see sleeve 410 and sleeve 415 of FIG. 10B) of decking brace 400, then laying work deck 200a and work deck 200b on top of the decking brace 400 with the attachment rods (e.g., see attachment rods 402, 404, 406, 408 of FIG. 9) on the decking brace 400 fitting into the corresponding sleeves (e.g., see sleeves 216 of FIG. 4A) in work deck 200a and work deck 200b.

Figure 13:
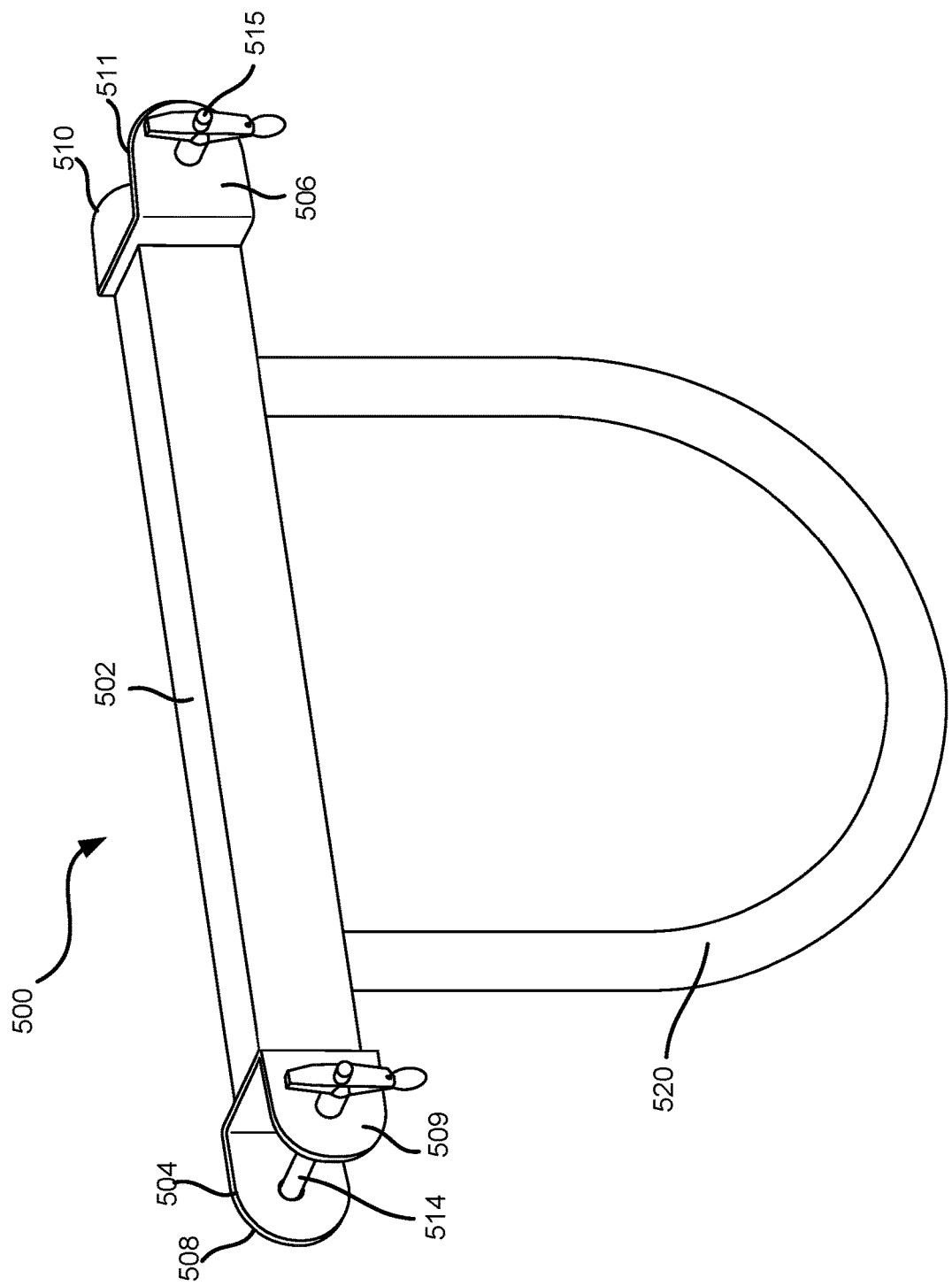
FIG. 13 illustrates a fixed safety flag of the scaffolding system of FIG. 1A and FIG. 1B in accordance with various exemplary embodiments.

Safety Flag:

With reference to FIG. 13, a safety flag 500 is illustrated, in accordance with various embodiments. In an exemplary embodiment, the safety flag 500 is made of e-coated and/or powder coated steel tubing. Safety flag 500 may include a tube 502 extending between a first end 504 of the safety flag 500 and a second end 506 of the safety flag 500. First end 504 of safety flag 500 may comprise a first tab 508 and a second tab 509. First tab 508 and second tab 509 may be configured to receive a first pin 514 (e.g., a cotter-style pin) to lock the first end 504 of the safety flag 500 to a vertical upright support (e.g., vertical upright support 12 of FIG. 15). Second end 506 of safety flag 500 may comprise a first tab 510 and a second tab 511. First tab 510 and second tab 511 may be configured to receive a second pin 515 (e.g., a cotter-style pin) to lock the second end 506 of the safety flag 500 to a vertical upright support (e.g., vertical upright support 13 of FIG. 15).

Safety flag 500 may further include a visual member 520 extending from tube 502. Visual member 520 may provide a physical and visual barrier which may tend to prevent workers from falling off the ends of the work decks.

Figure 14:
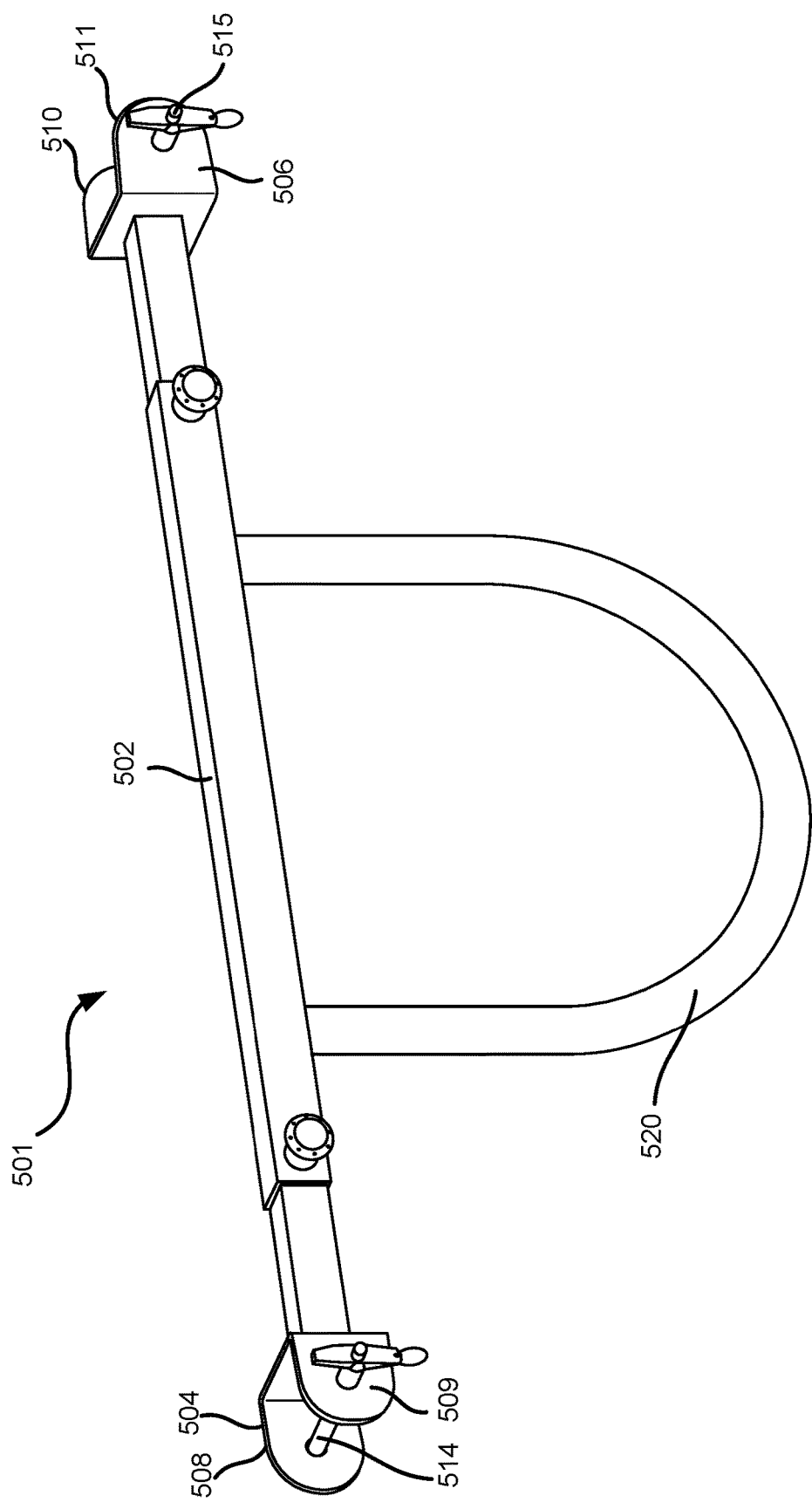
FIG. 14 illustrates a telescoping safety flag of the scaffolding system of FIG. 1A and FIG. 1B in accordance with various exemplary embodiments.

The safety flag 500 may be configured as one of at least 2 versions, for example: a telescoping version (see safety flag 501 of FIG. 14) that allows operators to fit the flag to a double-wide work deck assembly, and a fixed version (see safety flag 500 of FIG. 13) for use when a single-wide work deck assembly is desired.

Figure 15:
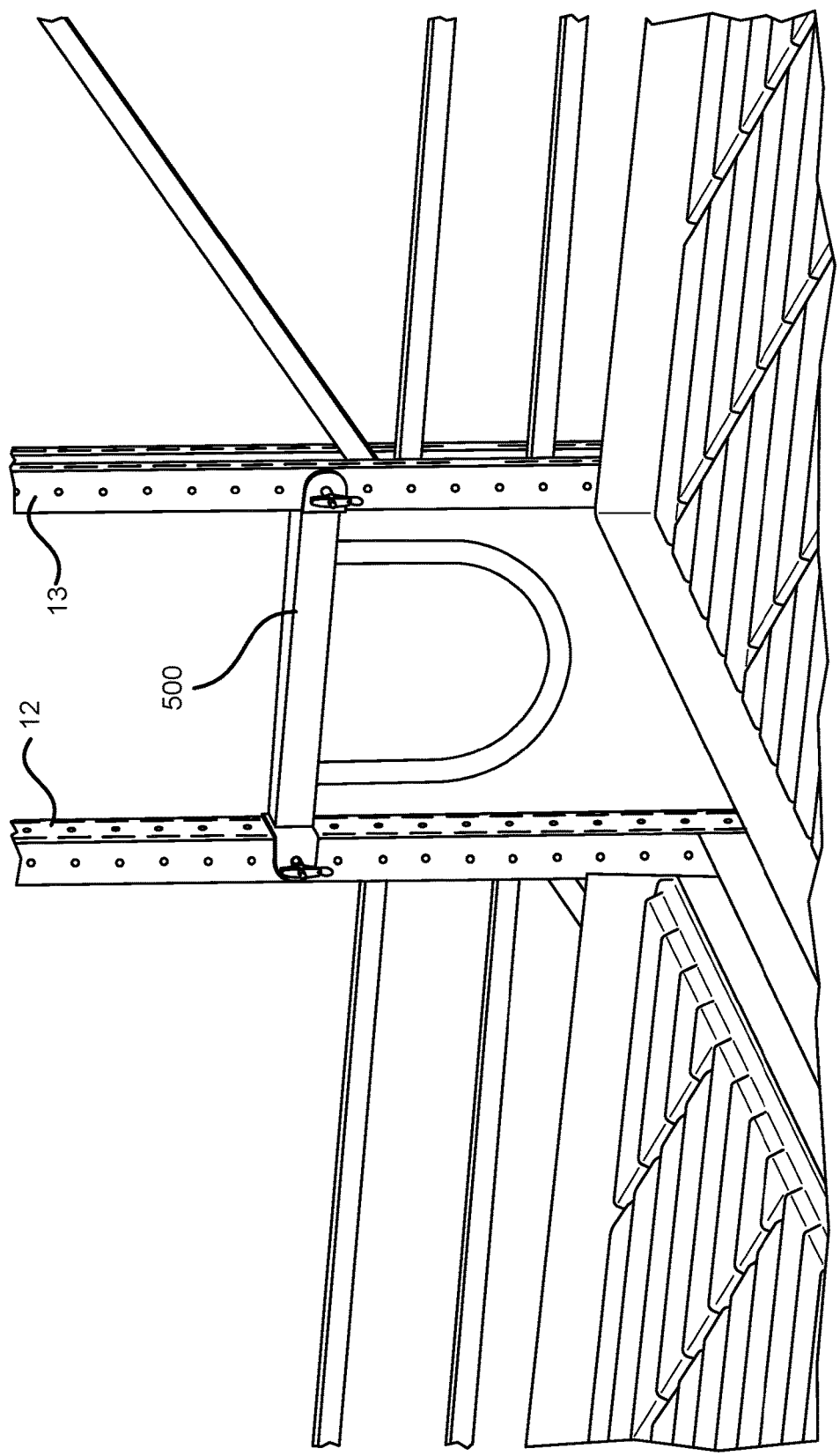
FIG. 15 illustrates a fixed safety flag installed onto a vertical horticulture racking system of FIG. 1A and FIG. 1B in accordance with various exemplary embodiments.

With reference to FIG. 15, safety flag 500 is illustrated installed to vertical upright support 12 of a first shelf apparatus and vertical upright support 13 of a second shelf apparatus.

Figure 16:
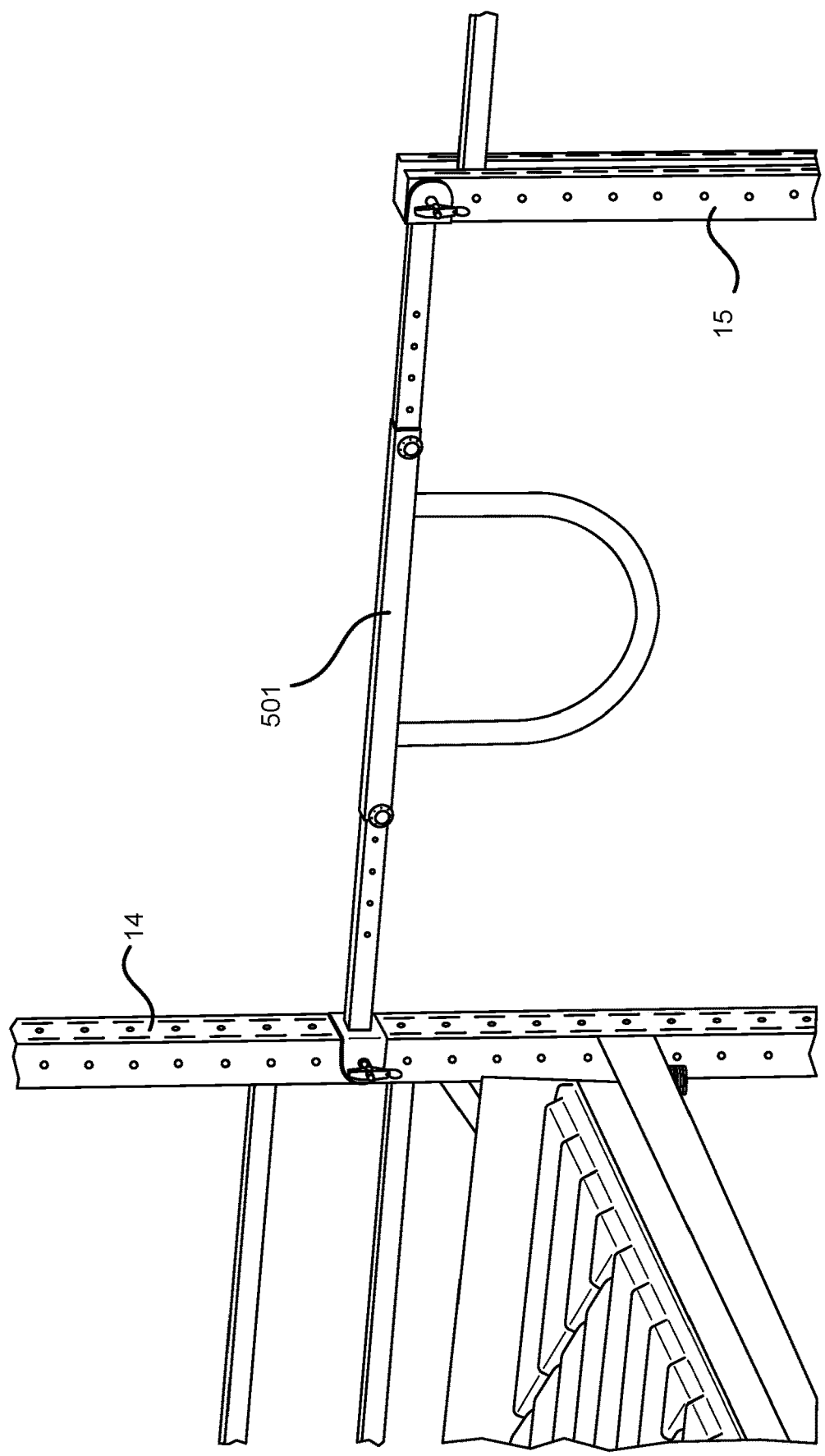
FIG. 16 illustrates a telescoping safety flag installed onto a vertical horticulture racking system of FIG. 1A and FIG. 1B in accordance with various exemplary embodiments.

With reference to FIG. 16, safety flag 501 is illustrated installed to vertical upright support 14 of a first shelf apparatus and vertical upright support 15 of a second shelf apparatus.

Figure 17A:
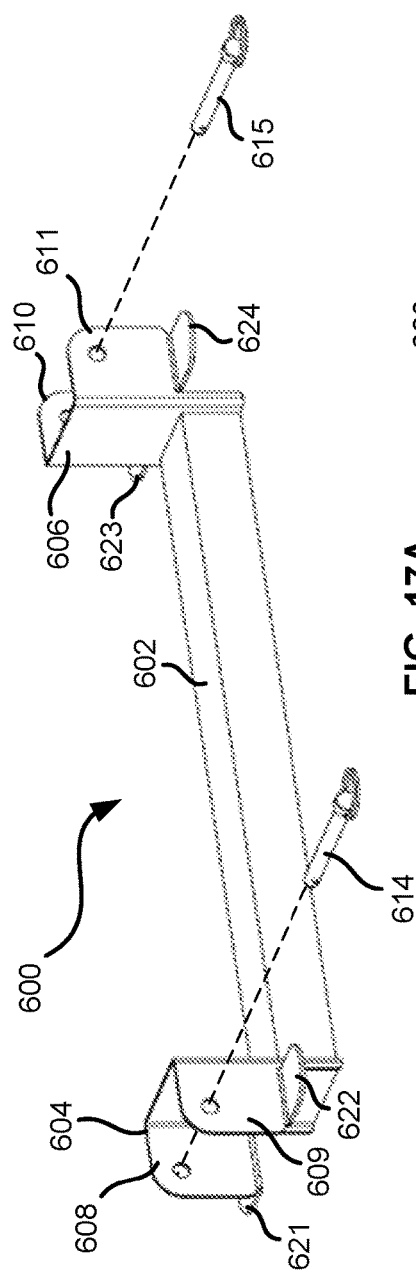
FIGS. 17A, 17B, and 17C illustrate a perspective view, a top view, and a side view, respectively, of a fixed trim cover of the scaffolding system of FIG. 1A and FIG. 1B in accordance with various exemplary embodiments.
Figure 17B:
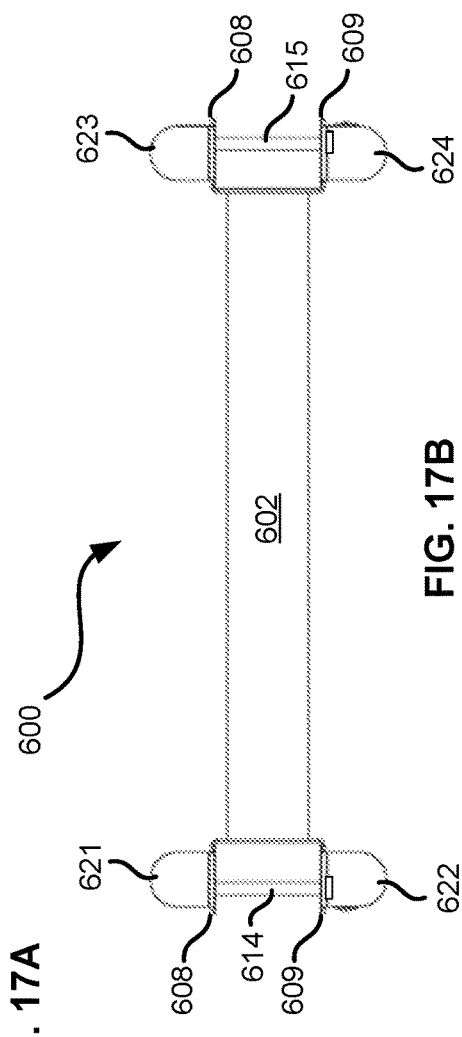
Figure 17C:
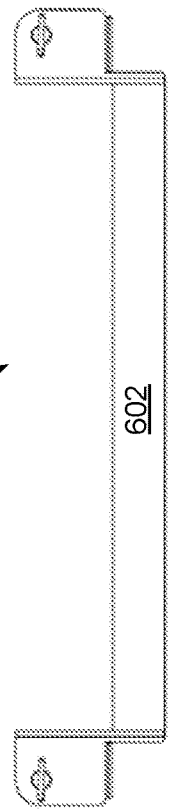

Trim Cover:

With reference to FIG. 17A, FIG. 17B, and FIG. 17C, a trim cover 600 is illustrated, in accordance with various embodiments. In one exemplary embodiment, the trim cover 600 is made from e-coated and/or powder-coated steel. Trim cover 600 may include a tube 602 extending between a first end 604 of the trim cover 600 and a second end 606 of the trim cover 600. First end 604 of trim cover 600 may comprise a first tab 608 (also referred to herein as a first vertical tab) and a second tab 609 (also referred to herein as a second vertical tab). First tab 608 and second tab 609 may be configured to receive a first pin 614 (e.g., a cotter-style pin) to lock the first end 604 of the trim cover 600 to a vertical upright support (e.g., vertical upright support 16 of FIG. 19). Second end 606 of trim cover 600 may comprise a first tab 610 (also referred to herein as a first vertical tab) and a second tab 611 (also referred to herein as a second vertical tab). First tab 610 and second tab 611 may be configured to receive a second pin 615 (e.g., a cotter-style pin) to lock the second end 606 of the trim cover 600 to a vertical upright support (e.g., vertical upright support 17 of FIG. 19).

First end 604 of trim cover 600 may comprise a first horizontal tab 621 extending from first tab 608 and a second horizontal tab 622 extending from second tab 609. Second end 606 of trim cover 600 may comprise a first horizontal tab 623 extending from first tab 610 and a second horizontal tab 624 extending from second tab 611. First horizontal tab 621 and first horizontal tab 623 may be configured to secure a first work deck (e.g., work deck 200a of FIG. 19) in an installed position. Second horizontal tab 622 and second horizontal tab 624 may be configured to secure a second work deck (e.g., work deck 200b of FIG. 19) in an installed position.

Figure 18:
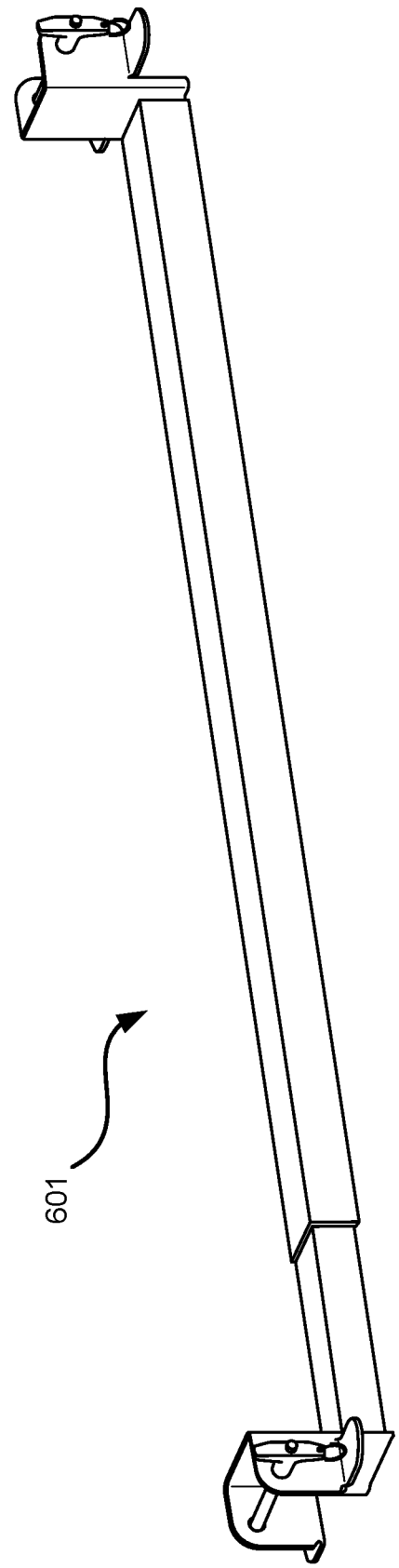
FIG. 18 illustrates a perspective view of a telescoping trim cover of the scaffolding system of FIG. 1A and FIG. 1B in accordance with various exemplary embodiments.
Figure 19:
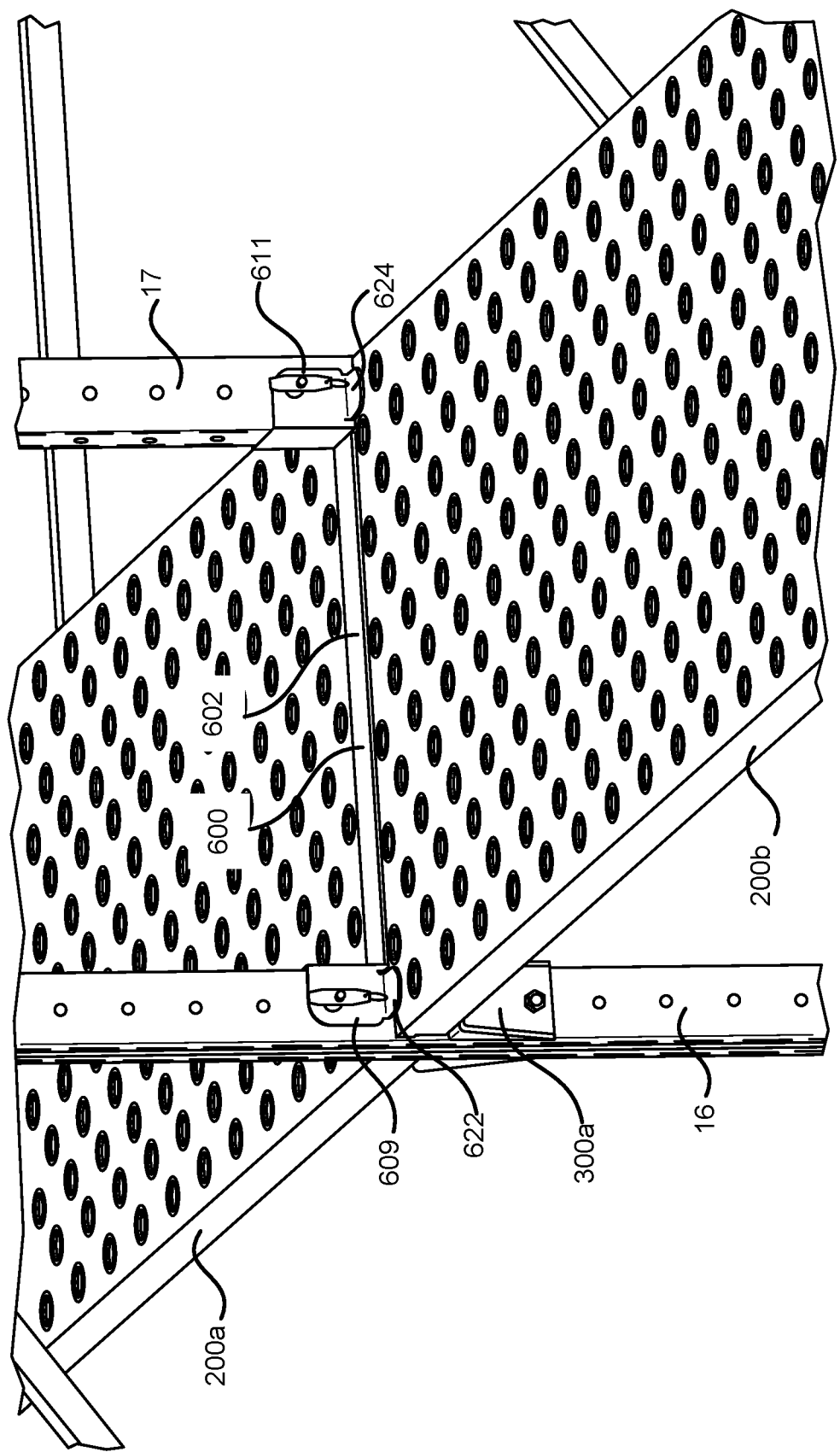
FIG. 19 illustrates a fixed trim cover installed onto a vertical horticulture racking system of FIG. 1A and FIG. 1B in accordance with various exemplary embodiments.
Figure 20:
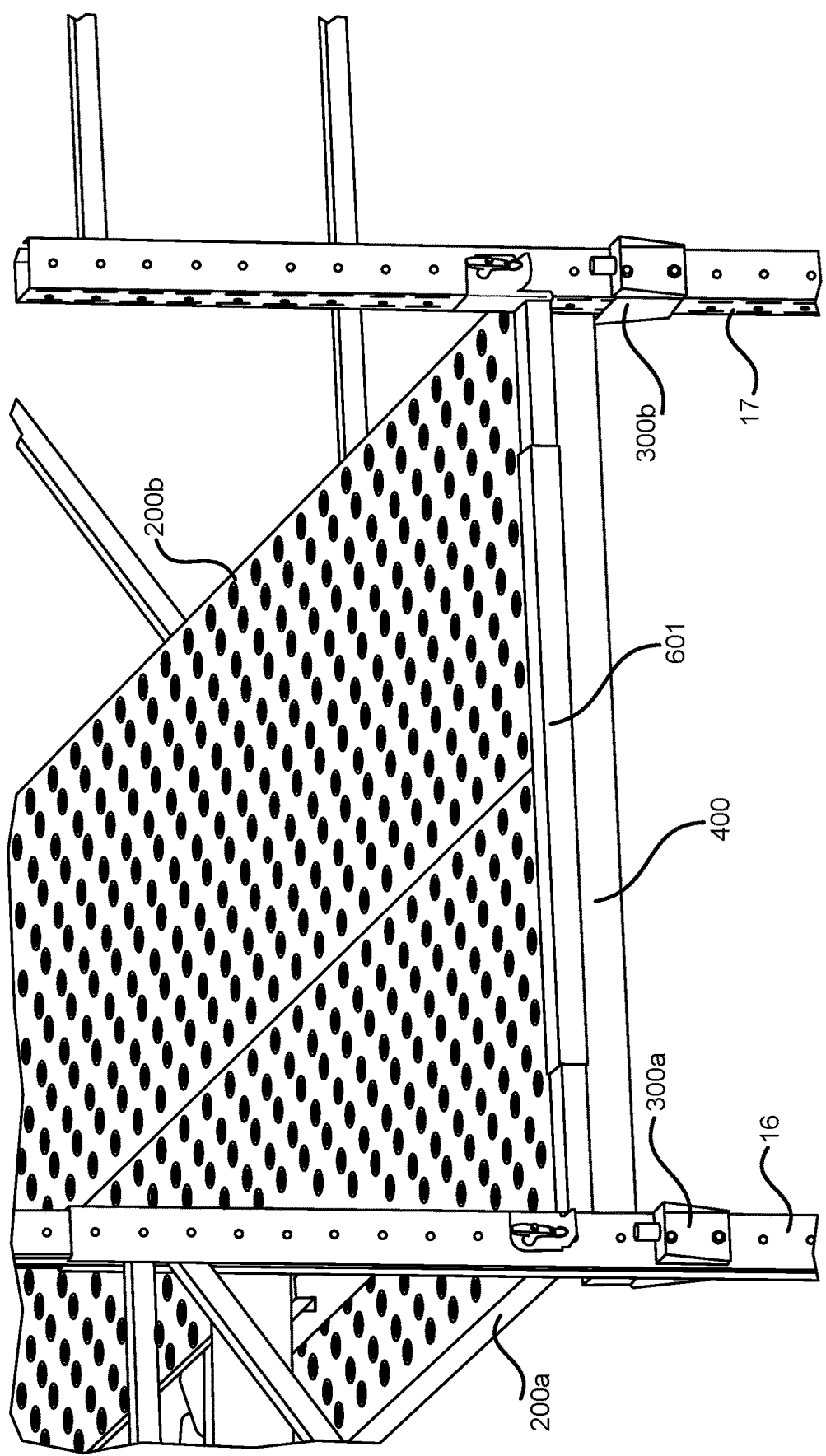
FIG. 20 illustrates a telescoping trim cover installed onto a vertical horticulture racking system of FIG. 1A and FIG. 1B in accordance with various exemplary embodiments.

The trim cover may be configured as one of at least 2 versions, for example: a fixed version (see trim cover 600 of FIG. 17A) for use when a single-wide work deck assembly is utilized (see FIG. 19), and a telescoping version (see trim cover 601 of FIG. 18) that allows operators to fit the cover to a double-wide work deck assembly (see FIG. 20).

With reference to FIG. 19, trim cover 600 may be utilized for multiple purposes, for example (i) to fill a gap between work decks (i.e., work deck 200a and work deck 200b) that will prevent tripping, and (ii) to lock the work decks 200a, 200b securely into the receiving deck brace or vertical upright bracket rods (see first vertical upright bracket 300a). An end of work deck 200b is captured between second horizontal tab 622 and first vertical upright bracket 300a. Tube 602 may be disposed between first work deck 200a and second work deck 200b. Tube 602 may be substantially flush with first work deck 200a and second work deck 200b.

With reference to FIG. 20, telescoping trim cover 601 is installed over a double-wide work deck arrangement including work deck 200a and work deck 200b in a side-by-side configuration. First vertical upright bracket 300a is coupled to vertical upright support 16 and second vertical upright bracket 300b is coupled to vertical upright support 17. Decking brace 400 is installed over first vertical upright bracket 300a and second vertical upright bracket 300b. Decking brace 400 supports a first end of work deck 200a and a first end of work deck 200b. Telescoping trim cover 601 is coupled between vertical upright support 16 and vertical upright support 17.

Via use of the exemplary systems and methods disclosed herein, plant growing density may be increased and operator safety improved. It will be appreciated, however, that exemplary systems disclosed herein are not necessarily limited to horticulture applications and can be applied or utilized in connection with service and/or access to various shelving or storage systems used in a variety of industries or applications, again facilitating improved operator safety as well as potentially increased storage density and/or space utilization.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A configurable scaffolding system, comprising:
a first work deck;
a second work deck;
a first vertical upright bracket configured to support the first work deck and the second work deck;
a second vertical upright bracket configured to support the first work deck and the second work deck; and
a trim cover disposed overlaying a parting line between the first work deck and the second work deck,
wherein a first end of the first work deck is configured to be disposed between a first portion of the first vertical upright bracket and a first portion of the trim cover in an installed position,
wherein a second end of the second work deck is configured to be disposed between a second portion of the second vertical upright bracket and a second portion of the trim cover in the installed position,
wherein the trim cover comprises a first end, a second end, and a tube extending between the first and second ends of the trim cover, and
wherein the first end of the trim cover comprises:
a first vertical tab and a second vertical tab whereby the trim cover is configured to be coupled to a vertical upright support;
a first horizontal tab extending from the first vertical tab, wherein the first portion of the trim cover comprises the first horizontal tab; and
a second horizontal tab extending from the second vertical tab, wherein the second portion of the trim cover comprises the second horizontal tab.

2. The configurable scaffolding system of claim 1, wherein the first vertical upright bracket comprises:
a first wall;
a second wall;
a third wall extending from the first wall to the second wall, wherein the first wall, the second wall, and the third wall define a channel configured to receive the vertical upright support, and the first wall is disposed opposite the channel from the second wall;
a first tab extending from the first wall;
a second tab extending from the second wall;
a first attachment rod extending from the first tab, the first attachment rod is configured to be received by the first work deck; and
a second attachment rod extending from the second tab, the second attachment rod is configured to be received by the second work deck.

3. The configurable scaffolding system of claim 2, wherein the tube is substantially flush with the first work deck and the second work deck.

4. The configurable scaffolding system of claim 1, further comprising a safety flag, wherein the safety flag comprises a visual member.

* * * * *